US009011963B2

(12) United States Patent
Osterwalder et al.

(10) Patent No.: US 9,011,963 B2
(45) Date of Patent: Apr. 21, 2015

(54) COMPOSITIONS OF LOW SODIUM SALT AND METHODS OF MAKING AND USING

(71) Applicant: S&P Ingredient Development LLC, Minnetonka, MN (US)

(72) Inventors: Neil Osterwalder, Carlsbad, CA (US); Sambasiva Rao Chigurupati, Omaha, NE (US); Pratik Nandan Bhandari, Lincoln, NE (US)

(73) Assignee: S&P Ingredient Development, LLC, Minnetonka, MN (US)

( * ) Notice: Subject to any disclaimer, the term of this patent is extended or adjusted under 35 U.S.C. 154(b) by 0 days.

(21) Appl. No.: 14/086,560

(22) Filed: Nov. 21, 2013

(65) Prior Publication Data

US 2014/0255589 A1 Sep. 11, 2014

Related U.S. Application Data

(60) Provisional application No. 61/729,199, filed on Nov. 21, 2012.

(51) Int. Cl.
*A23L 1/22* (2006.01)
*A23L 1/237* (2006.01)

(52) U.S. Cl.
CPC .............. *A23L 1/237* (2013.01); *Y10S 426/806* (2013.01)

(58) Field of Classification Search
CPC ............................ A23L 1/237; Y10S 426/806
USPC ........... 426/649, 520, 512, 515, 516, 74, 514, 426/806
See application file for complete search history.

(56) References Cited

U.S. PATENT DOCUMENTS

| | | | |
|---|---|---|---|
| 3,514,296 | A | 5/1970 | Frank et al. |
| 4,293,535 | A | 10/1981 | Arendt |
| 4,473,595 | A | 9/1984 | Rood et al. |
| 5,034,378 | A | 7/1991 | Cox |
| 5,447,543 | A | 9/1995 | Sadan |
| 5,562,942 | A | 10/1996 | Koh et al. |
| 5,871,803 | A | 2/1999 | Bonorden et al. |
| 6,090,419 | A | 7/2000 | Popplewell et al. |
| 6,541,050 | B1 | 4/2003 | Bonorden et al. |
| 6,749,835 | B1 | 6/2004 | Lipp et al. |

(Continued)

FOREIGN PATENT DOCUMENTS

| | | |
|---|---|---|
| EP | 0090571 | 10/1983 |
| GB | 2396793 A | 7/2004 |

(Continued)

OTHER PUBLICATIONS

USPTO Non-Final Office Action in U.S. Appl. No. 13/083,179, dated Jun. 19, 2012, 15 pages.

(Continued)

*Primary Examiner* — Helen F Heggestad
(74) *Attorney, Agent, or Firm* — Fish & Richardson P.C.

(57) ABSTRACT

The present invention is directed to salt compositions and methods used to make them. Embodiments may include methods for preparing salt compositions that include aerosolizing a melted salt composition to form droplets, where the droplets form rounded particles. Embodiments may further include solid compositions, including rounded salt particles, where the particles are formed by aerosolizing a melted salt composition. The particles can have semisolid interiors with void spaces.

24 Claims, 33 Drawing Sheets

(56) References Cited

U.S. PATENT DOCUMENTS

| | | | |
|---|---|---|---|
| 6,787,169 | B1 | 9/2004 | Maki |
| 7,276,224 | B2 * | 10/2007 | Zachariah et al. ......... 423/592.1 |
| 7,402,328 | B2 | 7/2008 | Vasquez |
| 7,452,563 | B2 | 11/2008 | Salemme et al. |
| 7,455,872 | B2 | 11/2008 | Salemme et al. |
| 7,820,225 | B2 | 10/2010 | Zuniga |
| 7,854,956 | B2 | 12/2010 | Flores Zuniga |
| 7,989,016 | B2 | 8/2011 | Chigurupati |
| 8,197,878 | B2 | 6/2012 | Chigurupati |
| 8,329,236 | B2 | 12/2012 | Chigurupati |
| 8,435,555 | B2 | 5/2013 | Minter et al. |
| 2004/0047976 | A1 | 3/2004 | Narayan et al. |
| 2006/0286378 | A1 | 12/2006 | Chiruvolu et al. |
| 2007/0059428 | A1 | 3/2007 | Chigurupati |
| 2007/0207084 | A1 | 9/2007 | Zachariah et al. |
| 2008/0003339 | A1 | 1/2008 | Johnson et al. |
| 2008/0003344 | A1 | 1/2008 | Jensen et al. |
| 2008/0008790 | A1 | 1/2008 | Jensen et al. |
| 2008/0038411 | A1 | 2/2008 | Jensen et al. |
| 2008/0085360 | A1 | 4/2008 | Chigurupati |
| 2009/0041900 | A1 | 2/2009 | Zuniga |
| 2009/0117254 | A1 | 5/2009 | Chigurupati |
| 2009/0169701 | A1 | 7/2009 | Pfeiffer et al. |
| 2009/0297631 | A1 | 12/2009 | Adkins et al. |
| 2011/0052785 | A1 | 3/2011 | Zuniga et al. |
| 2011/0217553 | A1 | 9/2011 | Warner et al. |
| 2012/0114948 | A1 | 5/2012 | Dale et al. |
| 2012/0128826 | A1 | 5/2012 | Chigurupati |
| 2012/0128830 | A1 | 5/2012 | Chigurupati |
| 2013/0196049 | A1 | 8/2013 | Brown et al. |
| 2013/0243924 | A1 | 9/2013 | Bhandari et al. |

FOREIGN PATENT DOCUMENTS

| | | |
|---|---|---|
| JP | H9086923 A | 3/1997 |
| JP | H09173010 | 7/1997 |
| JP | 3890512 B2 | 3/2007 |
| WO | WO0235991 A3 | 5/2002 |
| WO | WO2008043054 A3 | 4/2008 |
| WO | WO 2010/119282 | 10/2010 |
| WO | WO2012067673 A1 | 5/2012 |

OTHER PUBLICATIONS

Mary Ellen Kuhn, Strategies for Reducing Sodium in the U.S., Food Technology, May 2010, pp. 34-36.

Barbara Katz et al., Salt Reduction Gains Momentum, Food Technology, May 2010, pp. 25-32.

Christopher M. Parry et al., Monkeying Around With Taste, FoodScienceCentral.Com, May 5, 2005, 4 pages.

Nathan Gray, Taste Receptors Understanding May Hold Key for Low-Cal Sweeteners: Review, FoodNavigator.Com, Mar. 3, 2011, 2 pages.

Fidel Toldra et al., Recent Patents for Sodium Reduction in Foods, Jul. 25, 2008, vol. 1, No. 1, 2009 Bentham Science Publishers Ltd., pp. 80-86.

Thomas Hofmann, et al., Challenges in Taste Research Present Knowledge and Future Implications, American Chemical Society 2004, Nov. 11, 2003, 24 pages.

Understandingfoodadditives.org, Anti-Caking Agents, archive.org, Aug. 25, 2006, 2 pages.

Authorized Officer, Lee W. Young, International Search Report and Written Opinion of The International Searching Authority for International Application No. PCT/US2011/031803, mailed Aug. 31, 2011, 6 pages.

Authorized Officer, Simin Baharlou, International Preliminary Report on Patentability for International Application No. PCT/US2011/031803, dated May 21, 2013, 5 pages.

U.S. Appl. No. 13/668,838, filed Nov. 5, 2012, Chigurupati.

U.S. Appl. No. 13/971,602, filed Aug. 20, 2013, Chigurupati et al.

U.S. Appl. No. 14/145,647, filed Dec. 31, 2013, Chigurupati et al.

Matsen et al., "Rates and Mechanism of Phase Changes in Binary Mixtures of Alkali Halides," J. Am. Chem. Soc., 1941, vol. 63(12), pp. 3470-3473.

Pinho et al., "Solubility of NaCl, NaBr, and KCl in Water, Methanol, Ethanol, and Their Mixed Solvents," J. Chem. Eng. Data, 2005, vol. 50, pp. 29-32.

Rama et al., "Impact of Salt Crystal Size on In-Mouth Delivery of Sodium and Saltiness Perception from Snack Foods," J. Texture Studies, 2013, vol. 44, pp. 338-345.

Swientek, "SODA-LO salt microspheres," Innovative Showstoppers, Sep. 2013, vol. 67, No. 9, p. 47.

Young, International Search Report and Written Opinion for International Application No. PCT/US 13/71316, mailed Mar. 27, 2014, 10 pages.

* cited by examiner

| Size (μm) | % Volume Under | Size (μm) | % Volume Under | Size (μm) | % Volume Under |
|---|---|---|---|---|---|
| 0.0100 | 0.00 | 0.113 | 0.00 | 1.28 | 0.61 |
| 0.0114 | 0.00 | 0.128 | 0.00 | 1.45 | 0.61 |
| 0.0129 | 0.00 | 0.146 | 0.00 | 1.65 | 0.61 |
| 0.0147 | 0.00 | 0.166 | 0.00 | 1.88 | 0.61 |
| 0.0167 | 0.00 | 0.188 | 0.0005 | 2.13 | 0.61 |
| 0.0189 | 0.00 | 0.214 | 0.07 | 2.42 | 0.61 |
| 0.0215 | 0.00 | 0.243 | 0.14 | 2.75 | 0.68 |
| 0.0244 | 0.00 | 0.276 | 0.22 | 3.12 | 0.76 |
| 0.0278 | 0.00 | 0.314 | 0.30 | 3.55 | 0.84 |
| 0.0315 | 0.00 | 0.357 | 0.39 | 4.03 | 0.93 |
| 0.0358 | 0.00 | 0.405 | 0.47 | 4.58 | 1.04 |
| 0.0407 | 0.00 | 0.460 | 0.54 | 5.21 | 1.18 |
| 0.0463 | 0.00 | 0.523 | 0.61 | 5.92 | 1.38 |
| 0.0526 | 0.00 | 0.594 | 0.61 | 6.72 | 1.71 |
| 0.0597 | 0.00 | 0.675 | 0.61 | 7.64 | 2.22 |
| 0.0679 | 0.00 | 0.767 | 0.61 | 8.68 | 3.01 |
| 0.0771 | 0.00 | 0.872 | 0.61 | 9.86 | 4.16 |
| 0.0876 | 0.00 | 0.991 | 0.61 | 11.2 | 5.77 |
| 0.0995 | 0.00 | 1.13 | 0.61 | 12.7 | 7.92 |
| Size (μm) | % Volume Under | Size (μm) | % Volume Under | Size (μm) | % Volume Under |
| 14.5 | 10.65 | 98.1 | 62.68 | 666 | 83.46 |
| 16.4 | 13.96 | 111 | 64.40 | 756 | 85.75 |
| 18.7 | 17.80 | 127 | 66.00 | 859 | 88.12 |
| 21.2 | 22.06 | 144 | 67.46 | 976 | 90.45 |
| 24.1 | 26.59 | 163 | 68.82 | 1110 | 92.62 |
| 27.4 | 31.23 | 186 | 70.06 | 1260 | 94.51 |
| 31.1 | 35.80 | 211 | 71.20 | 1430 | 96.09 |
| 35.3 | 40.15 | 240 | 72.26 | 1630 | 97.32 |
| 40.1 | 44.18 | 272 | 73.28 | 1850 | 98.25 |
| 45.6 | 47.82 | 310 | 74.28 | 2100 | 98.92 |
| 51.8 | 51.06 | 352 | 75.34 | 2390 | 99.39 |
| 58.9 | 53.93 | 400 | 76.52 | 2710 | 99.71 |
| 66.9 | 56.47 | 454 | 77.88 | 3080 | 99.91 |
| 76.0 | 58.75 | 516 | 79.48 | 3500 | 100.00 |
| 86.4 | 60.80 | 586 | 81.35 | | |

FIG. 17B

| Size (μm) | % Volume Under | Size (μm) | % Volume Under | Size (μm) | % Volume Under |
|---|---|---|---|---|---|
| 0.0100 | 0.00 | 0.113 | 0.00 | 1.28 | 0.61 |
| 0.0114 | 0.00 | 0.128 | 0.00 | 1.45 | 0.61 |
| 0.0129 | 0.00 | 0.146 | 0.00 | 1.65 | 0.61 |
| 0.0147 | 0.00 | 0.166 | 0.00 | 1.88 | 0.61 |
| 0.0167 | 0.00 | 0.188 | 0.00007 | 2.13 | 0.61 |
| 0.0189 | 0.00 | 0.214 | 0.01 | 2.42 | 0.61 |
| 0.0215 | 0.00 | 0.243 | 0.03 | 2.75 | 0.61 |
| 0.0244 | 0.00 | 0.276 | 0.06 | 3.12 | 0.67 |
| 0.0278 | 0.00 | 0.314 | 0.11 | 3.55 | 0.74 |
| 0.0315 | 0.00 | 0.357 | 0.19 | 4.03 | 0.83 |
| 0.0358 | 0.00 | 0.405 | 0.30 | 4.58 | 0.94 |
| 0.0407 | 0.00 | 0.460 | 0.44 | 5.21 | 1.07 |
| 0.0463 | 0.00 | 0.523 | 0.61 | 5.92 | 1.26 |
| 0.0526 | 0.00 | 0.594 | 0.61 | 6.72 | 1.54 |
| 0.0597 | 0.00 | 0.675 | 0.61 | 7.64 | 1.94 |
| 0.0679 | 0.00 | 0.767 | 0.61 | 8.68 | 2.51 |
| 0.0771 | 0.00 | 0.872 | 0.61 | 9.86 | 3.32 |
| 0.0876 | 0.00 | 0.991 | 0.61 | 11.2 | 4.43 |
| 0.0995 | 0.00 | 1.13 | 0.61 | 12.7 | 5.90 |

| Size (μm) | % Volume Under | Size (μm) | % Volume Under | Size (μm) | % Volume Under |
|---|---|---|---|---|---|
| 14.5 | 7.78 | 98.1 | 65.56 | 666 | 92.82 |
| 16.4 | 10.11 | 111 | 68.91 | 756 | 94.11 |
| 18.7 | 12.88 | 127 | 71.98 | 859 | 95.36 |
| 21.2 | 16.10 | 144 | 74.75 | 976 | 96.53 |
| 24.1 | 19.70 | 163 | 77.22 | 1110 | 97.55 |
| 27.4 | 23.64 | 186 | 79.40 | 1260 | 98.40 |
| 31.1 | 27.82 | 211 | 81.31 | 1430 | 99.04 |
| 35.3 | 32.17 | 240 | 82.96 | 1630 | 99.49 |
| 40.1 | 36.61 | 272 | 84.41 | 1850 | 99.77 |
| 45.6 | 41.07 | 310 | 85.70 | 2100 | 99.93 |
| 51.8 | 45.49 | 352 | 86.89 | 2390 | 100.00 |
| 58.9 | 49.83 | 400 | 88.02 | 2710 | 100.00 |
| 66.9 | 54.04 | 454 | 89.15 | 3080 | 100.00 |
| 76.0 | 58.09 | 516 | 90.33 | 3500 | 100.00 |
| 86.4 | 61.94 | 586 | 91.55 | | |

FIG. 18B

COMPOSITIONS OF LOW SODIUM SALT AND METHODS OF MAKING AND USING

CROSS REFERENCE TO RELATED APPLICATIONS

This application claims the benefit of U.S. Provisional Patent Application No. 61/729,199 filed Nov. 21, 2012, of which the entire disclosure is incorporated herein by reference.

FIELD

The present invention relates to low sodium salt compositions and methods used to make them. More particularly, the invention relates to salt compositions having rounded particles and methods of making salt compositions having rounded particles.

BACKGROUND

Sodium chloride (NaCl) is well known. While salt imparts a desirable taste and flavor to food, too much use can result in long term adverse health risks. Because of the proliferation of salt in prepared foods and other products found in a grocery store, many people exceed the average recommended daily intake. Exceeding the recommended daily intake of sodium is a significant risk factor in developing high blood pressure and a cause or contributing factor in the rising incidence of heart disease. As such, medical professionals and governmental authorities recommend a reduction in per capita salt consumption of from about 4000 mg per day to a level of about 2300 mg or less per day.

Dietary Guidelines issued in the U.S. in 2005 suggest a proposed consumption limit of 2300 mg of sodium per day and the National Academy of Science (NAS) even suggests 1500-2300 mg of sodium per day. Health advocates at the American Heart Association and the Centers for Disease Control support changing the sodium limit to 1500 mg in the 2010 Dietary Guidelines. The NAS also recommends a potassium consumption of 4,700 mg per day. Typically potassium consumption is less than half of that level.

Because of these and other reasons, there are a variety of salt substitutes in the market. The classical approach to the production of salt substitutes involves combining sodium and potassium salts, or occasionally magnesium salts, in various ratios, and adding a wide variety of other modifiers (i.e., additives, flavorants, and masking agents) to this mix. The other additives are generally added to mask or at least partially reduce the generally metallic/bitter taste of potassium that has generally been associated with salt substitutes containing potassium and even magnesium. The processing techniques used to make these products include, among others, simple blending, agglomeration, extrusion cooking, and the like. Literature concerning reduced sodium compositions includes U.S. Patent Application Publication Nos. 2004/0047976 and 2012/0128830, U.S. Pat. No. 8,435,555, Japanese Patent Application Publication No. JP9173010, European Patent No. EP0090571, and PCT Application No. PCT/GB2010/050614, all of which are incorporated herein by reference.

U.S. Patent Application Publication No. 2004/0047976 discloses a granulated salt composition produced by mixing sodium chloride, potassium chloride, water and a flavor enhancer and granulating the resulting mass.

U.S. Patent Application Publication No. 2012/0128830 discloses low-sodium chloride compositions prepared by melting a mixture of sodium chloride and a non-sodium chloride and cooling the melted amalgamation to form a solid mass, which may be ground into smaller particles.

U.S. Pat. Nos. 7,989,016; 8,197,878; and 8,329,236 disclose the use of a wet process to make potassium chloride crystals that include a carrier and an acidulant for use as a salt substitute.

U.S. Pat. No. 8,435,555 discloses a salt product produced by mixing salt, a solvent (preferably water) and a polymeric organic material, and atomizing the mixture and evaporating the solvent. The resulting salt product can be in the form of hollow spheres formed from crystallites of salt.

Japanese Patent Application Publication No. JP9173010 discloses food additives produced by placing sodium chloride and, e.g., potassium chloride in cavities in a ceramic plate, melting the mixture after dehydration, slowly cooling to room temperature and taking the solidified product out of the cavities of the ceramic plate to obtain the food additive having a size corresponding to the size of the cavity.

European Patent No. EP090571 discloses flakes comprising sodium chloride and potassium chloride produced by separately grinding sodium chloride and potassium chloride to form particles having a size of less than 70 mesh. The particles are admixed and compacted into flakes.

PCT Application No. PCT/GB2010/050614 discloses a reduced sodium composition which is produced by melting sodium chloride together with one or more sodium chloride substitutes, cooling the melt to form a solid, and grinding the solid.

Generally, the taste of salt substitute mixtures without sodium chloride is unsatisfactory, so that most mixtures contain at least a portion of sodium chloride. However, even mixtures containing a portion of sodium chloride produce either a distinct off flavor or an inadequate salt taste, especially when the amount is intended not to differ significantly from the comparable amount of sodium chloride. Taste, functionality and consumer acceptance, not to mention cost, are all challenges in developing low sodium salt compositions and, thus far, no suitable salt replacement exists for all applications.

Accordingly, the problem of finding compositions that have a comparable appearance as sodium chloride, taste sufficiently salty, do not have an off flavor, and function like sodium chloride, while at the same time permitting the sodium content to be reduced in an economically feasible manner, continues to exist.

There is thus a need for improved salt compositions, and methods of making such compositions, that have reduced sodium content while at the same time having an appearance comparable to that of sodium chloride, tasting sufficiently salty, not having an off flavor, and functioning like sodium chloride.

SUMMARY

These and other needs are addressed by the various embodiments of the present invention. The following presents a simplified summary of the invention to provide an understanding of some aspects of the invention. This summary is not an extensive overview of the invention and its various embodiments. It is intended neither to identify key or critical elements of the invention nor to delineate the scope of the invention but to present selected concepts of the invention together with the more detailed description presented below.

The present embodiments are directed generally to salt compositions and methods used to make them. Some embodiments are directed to methods for preparing salt compositions that include aerosolizing a melted salt composition to form droplets, where the droplets form rounded particles. Embodiments may include solid compositions, including rounded salt particles, where the particles are formed by aerosolizing a melted salt composition.

In embodiments, the salt composition is sodium chloride without additional components. In further embodiments, the salt composition is a composition selected from sodium salts, potassium salts, magnesium salts, calcium salts, and combinations thereof. The salt may be a chloride salt, and the salt composition may include sodium chloride. The salt composition may further include a non-sodium chloride salt, and the non-sodium chloride salt may be selected from potassium chloride, magnesium chloride, calcium chloride, and combinations thereof. In an embodiment, the salt composition further comprises from about 1 to about 5 wt % $MgCl_2$.

Further, the melted salt composition may be produced by heating a salt composition in a furnace, and the temperature of the melted composition may be from about 650° C. to about 1000° C. The method may further include conveying the melted composition to at least one of a nebulizer, an ultrasonic atomizer, an electrospray atomizer, a centrifugal atomizer, and a gas atomizer.

Further embodiments may include food products, including a food material and rounded salt particles. The food products may be a fried food product, a baked food product, or an extruded food product. The food product may also be soups, sauces, baked goods, meat products, poultry products, snack products, dairy products, and breakfast cereals. The food product may be heated to a temperature from about 50° C. to about 250° C. during its preparation.

Embodiments include methods to make a food product, including combining a food material and rounded salt particles to form a food product; and treating the food product by a process selected from frying, baking, and extruding.

These embodiments can provide a number of benefits. For example, they can provide improved salt compositions, and methods of making such compositions, that have reduced sodium content while at the same time having an appearance comparable to that of sodium chloride, tasting sufficiently salty, not having an off flavor, and functioning like sodium chloride. The methods may provide improvement in sodium reduction using potassium chloride and NaCl without a masking agent. These and other advantages will be apparent from the disclosure contained herein.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

As used herein, "agglomeration" or "dry mixture" refers to a combination or mixture of components such that the constituent components in the combination or mixture are indistinguishable from one another upon non-magnified visual inspection.

As used herein, "amalgamation" refers to a combination or mixture of components such that the constituent components in the combination or mixture are indistinguishable from one another upon magnified visual inspection.

As used herein, "dietary supplement" refers to any product that contains a "dietary ingredient" intended to supplement the diet. The "dietary ingredients" in these products may include: vitamins, minerals, herbs or other botanicals, amino acids, and substances such as enzymes and metabolites. Dietary supplements can also be extracts or concentrates.

As used herein, "modifier(s)" refers to additives used to mask the off flavors in reduced sodium compositions. For instance, potassium chloride and magnesium chloride are known to impart bitter, metallic, or other off flavors when used to reduce the sodium content in salt replacement compositions. To mask these off flavors, additives are used. The term "modifier(s)" is used herein to include flavorants, masking agents, organic acids, and other terms used in the art to refer to additives used to alter the taste of a salt composition.

As used herein, "salt," unless modified by another word (i.e., reduced-salt, potassium salt, calcium salt and the like) or used itself to modify another word (i.e., salt substitute, salt composition and the like), means sodium chloride (NaCl).

As used herein, "regular" means unmodified. For example, "regular" salt or NaCl means unmodified NaCl, or NaCl that has not been additionally processed by heating and/or aerosolizing.

As used herein, "rounded" refers to a shape having one or more rounded edges. For instance, a rounded shape may include a cube, rectangular, crystalline shape having rounded corners, concave shapes, or bowl shapes. In addition, a rounded shape may include spherical or elliptical shapes, or any shapes containing curves. Rounded shapes can be, but are not necessarily, regular shapes, such as a sphere. Rounded shapes include particle shapes formed by methods of the present invention, such as a shape formed by molten material, or droplets of molten material cooled to a hardened material in a gas. Whether a thing, such as a particle, is rounded or not is considered in the context of the scale of the thing being considered. For instance, a particle may be rounded because the particle is generally spherical or elliptical even though the particle is composed of crystalline material that at a smaller scale than the scale of the particle has component parts that do not have rounded edges, concave shapes, bowl shapes or any shape containing a curve.

As used herein, "aerosolizing" means creating particles of a material in a gas, or creating an aerosol, which is a colloid suspension of fine solid particles or liquid droplets in a gas, or a "mixture of gas and liquid particles." An exemplary naturally occurring aerosol is a mist, formed when small vaporized water particles mixed with hot ambient air are cooled down and condense into a fine cloud of visible airborne water droplets. Aerosolizing may include atomizing, for example, using an atomizer nozzle. Aerosolizing may mean creating sprays, fogs, clouds, and/or smoke, which appear to be atomized.

As used herein, "similar appearance" refers to various aspects of an appearance. For instance, a "similar appearance" to salt or NaCl may mean having a similar color or transparency, or a similar particle size. Compositions may have a similar appearance without having a similar shape or surface area.

In an embodiment, a method is provided for preparing a salt composition, comprising aerosolizing a melted salt composition to form droplets, wherein the droplets form rounded particles. In another embodiment, a method is provided for producing a salt composition comprising melting a composition consisting essentially of chloride salts and aerosolizing the molten chloride salts to form particles. In another embodiment, a method is provided for producing a salt composition comprising melting a composition comprising chloride salts and aerosolizing the molten chloride salts to form particles.

In an embodiment, a solid composition is provided comprising rounded salt particles consisting essentially of chloride salts. In another embodiment, a solid composition is provided comprising rounded salt particles, wherein the particles are formed by aerosolizing a melted salt composition. In another embodiment, a particulate salt composition is provided that is formed from aerosolized molten chloride salts in the absence of a solvent. In another embodiment, a particulate salt composition is formed from aerosolized molten chloride salts in the absence of an organic material. In another embodiment, a particulate salt composition is formed from aerosolized molten chloride salts in the absence of a taste modifier.

In an embodiment, a food product is provided comprising a food material and rounded salt particles produced from molten salt. The food product can be selected from the group consisting of a fried food product, a baked food product, and an extruded food product. The food product can be selected from the group consisting of soups, sauces, baked goods, meat products, poultry products, snack products, dairy products, and breakfast cereals. The food product can be heated to a temperature from about 50° C. to about 250° C.

In accordance with an embodiment, a method to make a food product is provided, comprising combining a food material and rounded salt particles produced from molten salt to form a food product; and treating the food product by a process selected from the group consisting of frying, baking, and extruding. The food product can be selected from soups, sauces, baked goods, meat products, poultry products, snack products, dairy products, and breakfast cereals. The food product can be heated to a temperature from about 50° C. to about 250° C.

The salt can be selected from the group consisting of sodium salts, potassium salts, magnesium salts, calcium salts, and combinations thereof. The salts can be chloride salts. The salt can be sodium chloride. The salt can further comprise a non-sodium chloride salt. The non-sodium chloride salt can be selected from the group consisting of potassium chloride, magnesium chloride, calcium chloride, and combinations thereof. Preferably, the non-sodium chloride salt is potassium chloride. The salt can further include from about 1 to about 5 wt % magnesium chloride.

In an embodiment, there can be sodium and non-sodium salts located closely adjacent, uniformly distributed and intermingled in the particulate salts. In an embodiment chloride salts comprise potassium and sodium salts, and the potassium and sodium ions are closely adjacent, uniformly distributed and intermingled in the particulate salt composition.

The salt composition can comprise between about 1 wt % and about 100 wt % sodium chloride and between about 0 wt % and about 99 wt % potassium chloride. In an embodiment, the salt composition can include between about 30 wt % and about 70 wt % sodium chloride and between about 30 wt % and about 70 wt % potassium chloride. In an embodiment, the salt composition can include between about 45 wt % and about 55 wt % sodium chloride and between about 35 wt % and about 65 wt % potassium chloride. In an embodiment, the salt composition contains less than about 1%, 10%, 20%, 30%, 40%, 50%, 60%, 70%, 80%, 90% or 100% of sodium chloride.

The aerosolizing can include treating the melted salt composition in at least one of a nebulizer, an ultrasonic atomizer, an electrospray atomizer, a centrifugal atomizer, and a gas atomizer. The melted salt composition can be produced by heating a salt in a furnace. The temperature of the melted composition can be from about 650° C. to about 1000° C.

The rounded particles can further be sieved to isolate a particle size range. The rounded particles can have a diameter from about 1 micron to about 1000 microns or from about 3 microns to about 150 microns. The rounded particles can be ground. The rounded particles can be combined with at least one additive. The additive can be selected from the group consisting of an antioxidant, a dietary supplement, a phosphate, an anti-caking agent, a colorant, a salt enhancer, an organic acid, an amino acid, an amino acid derivative, a sugar, a sugar derivative, and combinations thereof. In an embodiment, the rounded particles are semisolid particles with internal voids. A salt substitute can be produced from the rounded particles.

The embodiments and configurations described herein are neither complete nor exhaustive. As will be appreciated, other embodiments of the invention are possible utilizing, alone or in combination, one or more of the features set forth above or described in detail below.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 1 shows an exemplary nebulizer in accordance with embodiments of the present invention;

FIG. 2 shows an exemplary flow chart of processes of the present invention;

FIG. 3 shows a scanning electron microscope (SEM) image of the composition of NaCl and KCl (50/50) blends made by classical melt blend known in the art;

FIG. 4 shows a scanning electron microscope image of NaCl;

FIG. 5 shows a scanning electron microscope image of KCl;

FIGS. 6A-6D show scanning electron microscope images of a mixture of 55 wt % NaCl and 45 wt % KCl of the present invention;

FIG. 7 shows an X-ray diffraction analysis of a NaCl/KCl (65/35) raw blend composition known in the art;

FIG. 8 shows an X-ray diffraction analysis of a NaCl/KCl (50/50) composition known in the art;

FIG. 9 shows an X-ray diffraction analysis of a NaCl/KCl (55/45) composition of the present invention;

FIG. 10 shows an X-ray diffraction analysis of a NaCl/KCl (75/25) composition of the present invention;

FIG. 11 shows an energy-dispersive X-ray spectroscopy analysis of a NaCl/KCl (55/45) composition of the present invention;

FIG. 12 shows an energy-dispersive X-ray spectroscopy analysis of Na in a NaCl/KCl (55/45) composition of the present invention;

FIG. 13 shows an energy-dispersive X-ray spectroscopy analysis of Cl in a NaCl/KCl (55/45) composition of the present invention;

FIG. 14 shows an energy-dispersive X-ray spectroscopy analysis of K in a NaCl/KCl (55/45) composition of the present invention;

FIG. 15 shows Differential Thermal Analysis (DTA) data for melting behaviors of exemplary salt samples;

FIG. 16 shows a phase diagram of NaCl/KCl;

FIGS. 17A-17B show a size distribution of a blend of 50 wt % NaCl/50 wt % KCl in accordance with the present invention in graphical form (FIG. 17A) and in table format (FIG. 17B);

FIGS. 18A-18B show a size distribution of 100% NaCl in accordance with the present invention in graphical form (FIG. 18A) and in table format (FIG. 18B);

DETAILED DESCRIPTION

Figure 1:
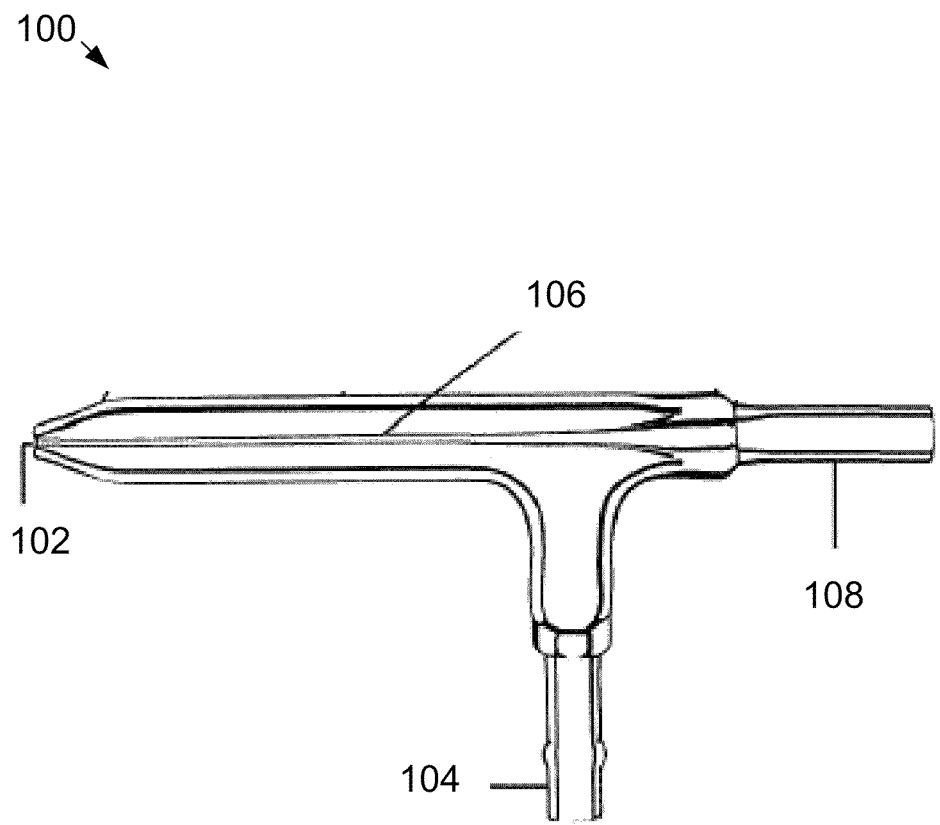

Unless defined otherwise, all technical and scientific terms used herein have the same meaning as is commonly understood by one of ordinary skill in the art. All patents, applications, published applications and other publications are incorporated by reference in their entirety. In the event that there is a plurality of definitions for a term herein, those provided in the Summary prevail unless stated otherwise.

The present embodiments are directed generally to salt compositions and methods used to make them. Various embodiments are directed to methods for preparing salt compositions that include aerosolizing a melted salt composition to form droplets, where the droplets form rounded particles. Further embodiments include solid compositions, including rounded salt particles, where the particles are formed by aerosolizing a melted salt composition. The rounded particles may be solid or hollow, but in embodiments are neither hollow nor solid, but rather possess void spaces in the center of semisolid particles. The particles may be fully enclosed, partially enclosed, or a concave shape.

In accordance with the present invention, processes for making a salt composition having a similar appearance to salt and taste as salt, while having a reduced sodium content, have been discovered. In addition, the salt compositions may include rounded particles that provide increased surface area to thereby increase the salty taste by increasing the area of the particle in contact with taste receptors, while not increasing the sodium content. Further, the salt composition may not require one or more, and may exclude or be in the absence of, the usual modifiers for masking the bitterness or off-taste of non-sodium chlorides. Related to the processes, resultant salt compositions that include an amalgamation of sodium chloride and one or more non-sodium chlorides, which lack the need to mask bitterness or off flavors, have been discovered. This is advantageous over prior art salt compositions because prior art salt compositions are primarily mixtures of components (for example, dry mixtures) and mixtures where particles of the mixtures did not have rounded shapes or homogenous component distribution. This means that the surface area of the prior art compositions in contact with taste receptors is less than that of the present invention. This variation in taste receptor activation where components are not simultaneously received, results in a combination of salty and bitter taste sensations. The combination of salty and bitter taste sensations is perceived as off flavors. Salt compositions of the prior art often include modifiers to mask the perception of off flavors.

In embodiments, the salt compositions may be solid homogeneous salt products that contact taste receptors such that the components are simultaneously received, resulting in a salty taste sensation. This is advantageous over prior art salt compositions because prior art salt compositions are primarily mixtures of components where each component does not necessarily contact a taste receptor at the same time as the other components, thereby resulting in a combination of salty and bitter taste sensations and off flavors. Salt compositions of the prior art include modifiers to mask the perception of off flavors.

The surprising and unexpected nature of this discovery can be appreciated by reference to the literature, which abundantly reports the non-rounded shape of salt composition particles, the bitter taste of non-sodium chlorides (e.g., potassium chloride and magnesium chloride), and the multiplicity of additives, other than sodium chloride, which have been used to alter this unpleasant taste. The fact that compositions of the present invention, such as sodium chloride, or a combination of sodium chloride and non-sodium chloride, heated to or beyond their respective melting points and aerosolized to form rounded particles lack the bitterness and off flavors associated with non-sodium chloride containing salt compositions is completely unexpected and entirely unpredictable.

Compositions

The salt compositions of the present invention, that include rounded particles of sodium chloride, or sodium chloride and a non-sodium chloride, can have less sodium, but still have the same taste and a similar appearance to that of a composition that includes only regular NaCl.

In embodiments, the salt composition is sodium chloride without additional components. In further embodiments, the salt composition is a composition selected from sodium salts, potassium salts, magnesium salts, calcium salts, and combinations thereof. The salt may be a chloride salt, and the salt composition may include sodium chloride. The salt composition may further include a non-sodium chloride salt, and the non-sodium chloride salt may be selected from potassium chloride, magnesium chloride, calcium chloride, and combinations thereof. Embodiments may include salt compositions that do not have organic components (e.g., ammonium salts) due to the fact that organic components burn or decompose at temperatures exceeding 500° C. In embodiments, organic components may be added after aerosolizing the particles of the present invention. In an embodiment, the salt composition further comprises from about 1 to about 5 wt % magnesium chloride.

The salt compositions may include 100 wt % sodium chloride, or between about 1 wt % and about 100 wt % sodium chloride and between about 0 wt % and about 99 wt % non-sodium chloride salt (e.g., potassium chloride), or between about 30 wt % and about 70 wt % sodium chloride and between about 30 wt % and about 70 wt % non-sodium chloride salt (e.g., potassium chloride), or between about 35 wt % and about 55 wt % sodium chloride and between about 45 wt % and about 65 wt % non-sodium chloride salt (e.g., potassium chloride). The salt composition may contain less than about 1%, 10%, 20%, 30%, 40%, 50%, 60%, 70%, 80%, 90% or 99% of sodium chloride Further, the salt compositions may be low sodium salt compositions. In particular, the compositions may contain about 10 wt % to 95 wt % lower sodium than regular salt. The compositions may contain about 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, or 95 wt % lower sodium than regular salt. In embodiments, the compositions may contain about 40 wt % to about 60 wt % lower sodium than regular salt, or about 50 wt % lower sodium than regular salt.

In embodiments, the salt compositions of the present invention may be combined with at least one additive. Additives other than inorganic salts may be added after processing the composition, because the melt temperatures will typically volatilize or decompose organic materials. Additives may be selected from one or more of an antioxidant, a dietary supplement, a phosphate, an anti-caking agent, a colorant, a salt enhancer, an organic acid, an amino acid, an amino acid derivative, a sugar, a sugar derivative, other ingredients typically present in table salt and salt substitute products, and combinations thereof.

For example, antioxidants may be added to reduce the rancidity of the salted products when cooked. Exemplary methods are discussed in U.S. Patent Publication No. 2012/0128830. In embodiments, suitable antioxidants may include rosemary extract, butylated hydroxytoluene, butylated hydroxyanisole, and tocopherols, among others. Phosphates may be added to tenderize the salted food product. Suitable phosphates may include monosodium phosphate, tetrasodium pyrophosphate, sodium hexametaphosphate, monopotassium phosphate, tetrapotassium pyrophosphate, disodium phosphate, sodium tripolyphosphate, sodium acid pyrophosphate, dipotassium phosphate, and potassium tripolyphosphate. Colorants may be added to give the salt compositions a distinct color. Suitable natural colorants include caramel color, turmeric, annatto, beta-carotene, paprika oleoresin, red cabbage juice, beet juice, grape skin extract, and carmine, among others. Dietary supplements may be added to support a nutritious diet. Suitable dietary supplements include vitamins, minerals, herbs or other botanicals, amino acids, substances such as enzymes, metabolites, and combinations thereof. In embodiments, the salt compositions of the present invention include magnesium chloride, vitamin D and calcium as dietary supplements. All types of magnesium, vitamin D and calcium are contemplated. Suitable anti-caking agents may be included in the salt composition of the present invention to prevent caking or the formation of lumps, or to provide a free flowing product and may include sodium hexacyanoferrate (II) (YPS), potassium hexacyanoferrate (II) tri hydrate (potassium ferrocyanide or YPP), tricalcium phosphate carbonate, magnesium carbonate, silicates, propylene glycol and silicon dioxide. In embodiments, an antioxidant used may also act as a colorant. In embodiments, the salt compositions of the present invention include magnesium chloride.

The salt compositions of the present invention may optionally contain other ingredients typically present in table salt and salt substitute products. Other suitable ingredients include iodide sources, flavors and flavor enhancers. An exemplary iodide source is KI with a dextrose stabilizer. Exemplary flavor enhancers include monosodium glutamate (MSG), meat extracts, protein hydrolysates, amino acids, hydrolyzed vegetable protein, autolyzed yeast and mononucleotide salts.

Various ranges of additives may be added. For example, an antioxidant may be added in the amount of about 0.01 wt % to about 1 wt %, a dietary supplement may be added in the amount of about 0.1 wt % to about 5 wt %, a phosphate may be added in the amount of about 0.1 wt % to about 10 wt %, an anti-caking agent may be added in the amount of about 0.1 wt % to about 2 wt %, a colorant additive may be added in the amount of about 0.01 wt % to about 1 wt %, a salt enhancer may be added in the amount of about 0.01 wt % to about 5 wt %, an organic acid may be added in the amount of about 0.01 wt % to about 5 wt %, an amino acid may be added in the amount of about 0.01 wt % to about 5 wt %, an amino acid derivative may be added in the amount of about 0.01 wt % to about 5 wt %, a sugar may be added in the amount of about 0.1 wt % to about 10 wt %, or a sugar derivative additive may be added in the amount of about 0.01 wt % to about 10 wt %. In embodiments, from about 0.1% to about 2% by weight of silicon dioxide may be added to the composition, or about 1% by weight of silicon dioxide.

Methods of Preparation

The process of making the salt compositions of the present invention include aerosolizing a salt composition, such as sodium chloride, or a composition of sodium chloride and a non-sodium chloride, that is heated to or beyond their respective melting points to form droplets wherein the droplets form rounded particles. The process can include mixing from about 1 wt % to about 100 wt % by weight sodium chloride and from about 99 wt % to about 0 wt % by weight of a non-sodium chloride, or from about 30 wt % to about 70 wt % by weight sodium chloride and from about 70 wt % to about 30 wt % by weight of a non-sodium chloride. In embodiments, the process includes mixing about 50 wt % by weight sodium chloride and about 50 wt % by weight of a non-sodium chloride.

In exemplary embodiments, sodium chloride may be mixed with non-sodium chloride, for example as a dry mix. The mixing of the sodium chloride and non-sodium chloride may be conducted in any suitable vessel. After the non-sodium chloride and the sodium chloride are mixed, the dry mixture is melted at a temperature at or above their respective melting points. In embodiments, sodium chloride may be the only component in the mixture. For instance, sodium chloride has a melting temperature of 801° C. and potassium chloride has a melting temperature of 770° C. Because the mixtures can have a lower melting temperature than the individual components, a temperature of about 650° C. or above can melt the combined components. Accordingly, the heating temperature may be from about 650° C. to about 1200° C., or from about 700° C. to about 1000° C. and above. A suitable heating temperature is one at which the components of the mixture will melt and form a homogeneous liquid amalgamation. In embodiments, the furnace temperature is at least about 650° C., 660° C., 670° C., 680° C., 690° C., 700° C., 710° C., 720° C., 730° C., 740° C., 750° C., 760° C., 770° C., 780° C., 790° C., 800° C., 810° C., 820° C., 830° C., 840° C., 850° C., 860° C., 870° C., 880° C., 890° C., 900° C., 910° C., 920° C., 930° C., 940° C., 950° C., 960° C., 970° C., 980° C., 990° C., 1000° C., 1010° C., 1025° C., or 1050° C. or more. In further embodiments, the heating temperature is at least about 800° C., 801° C., 802° C., 803° C., 804° C., 805° C., 850° C., 900° C., 910° C., 950° C., or 1000° C. In further embodiments, the heating temperature is at least about 850° C.

The mixture can be heated to form a molten mixture of the components. A suitable heating time is one at which the components of the mixture will melt and form a molten liquid from the salt, or a homogeneous liquid amalgamation. For example, the mixture can be heated for about 1 to about 60 minutes. In embodiments, the mixture is heated for about at least about 5, 10, 15, 20, 25, 30, 35, 40, or 45 minutes. In further embodiments, the mixture is heated for about 15 minutes or for a time based on the furnace power. The mixture may be heated in any suitable vessel and/or oven. The time and temperature of the heating process may vary depending upon how the heat is delivered to the material.

The heated composition, which is molten or liquefied by the application of heat, is then aerosolized. The method may further include conveying the melted composition to be aerosolized. The step of aerosolizing may include treating the melted salt composition in at least one of a nebulizer, an ultrasonic atomizer, an electrospray atomizer, a centrifugal atomizer, and a gas atomizer.

In embodiments, a nebulizer may be used to aerosolize the heated composition. Exemplary nebulizers use nitrogen, compressed air or ultrasonic power to break up medical solutions and suspensions into droplets. An exemplary nebulizer 100 used in embodiments of the present invention is shown in FIG. 1. FIG. 1 shows a self-aspirating nebulizer. Such nebulizers are produced by Meinhard® Glass Products, for example. The nebulizer shown in FIG. 1 has a nebulizer tip 102 consisting of two concentric tubes, an outer tube for gas input 104, and a capillary 106 for liquid uptake through an uptake tube 108. To boost liquid throughput, the liquid can be pumped through the nebulizer using liquid pressurization, peristaltic pumps, syringe pumps, membrane pumps, or other pumping devices (not shown).

The nebulizer may be constructed of any suitable material, such as stainless steel, hastelloy, palladium, platinum, etc. A nebulizer may also be coated with materials such as gold, palladium and platinum. Coatings are often more cost-effective than solid materials.

Commonly used nebulizers include jet nebulizers, which are also called "atomizers." Jet nebulizers are connected by tubing to a compressor that causes compressed air or nitrogen to flow at high velocity through a liquid medicine to turn it into an aerosol, which is then inhaled by the patient. Ultrasonic wave nebulizers may also be used. Ultrasonic wave nebulizers use an electronic oscillator to generate a high frequency ultrasonic wave, which causes the mechanical vibration of a piezoelectric element. This vibrating element is in contact with a liquid reservoir and its high frequency vibration is sufficient to produce a vapor mist.

Another type of nebulizer that may be used is an ultrasonic vibrating mesh technology. In ultrasonic vibrating mesh technology, a mesh/membrane with 1000-7000 laser drilled holes vibrates at the top of a liquid reservoir, and thereby pressures out a mist of droplets through the holes.

Electronic nebulizers may be used in the present invention. Electronic nebulizers produce a substantially monodisperse spectrum of particles when they aerosolize a solution into particles. Thus, nebulizers that produce aerosols having substantially monodisperse particle sizes, as well as nebulizers that produce aerosols having polydisperse particle sizes, may be used in the present invention.

Nebulizers used by the present invention may be included in parallel or in series, or in a showerhead assembly, for example, where the showerhead assembly includes one or more nebulizers configured to dispense a mixture as a mist with droplets. Advantages in processing may be achieved by methods of the present invention. For example, the methods may advantageously include improvements in efficiency and shorter processing times, and/or reduction in the amount of processing steps. Further advantages may include decreased waste and reduced heating and/or cooling costs, or other processing costs. Other technologies known in the art, and not discussed herein, may be used for aerosolizing.

The step of aerosolizing a melted salt composition forms droplets of the composition. As used herein, the term "droplet" refers to portions of the melted salt composition formed during the step of aerosolizing while the portion is in liquid form. As described below, such portions will solidify to form particles. The droplets will have a size that depends on the apparatus for forming the aerosol and how it is operated. The droplet size can be between about 1 micron to about 1000 microns, or from about 1 micron to about 500 microns, or from about 1 micron to about 300 microns, or from about 5 microns to about 150 microns, or from about 10 microns to about 100 microns, or from about 10 microns to about 50 microns.

Aerosolized particles solidify after being aerosolized to form rounded particles. In embodiments, they may solidify in the air, prior to touching a surface, or they may solidify after touching a surface. The aerosolized particles may be rounded particles and may be hollow or solid, and may solidify as hollow or solid particles. In embodiments, the rounded particles are sphere-like and are neither hollow nor solid, but instead are semisolid with void spaces. The void spaces can make up from about 5 volume percent to about 50 volume percent, and more typically from about 10 volume percent to about 20 volume percent of the total volume of the particle. In embodiments, the rounded surfaces (e.g., absence or reduction of crystal faces) indicate that the particles are amorphous or microcrystalline. In embodiments, collections of particles may be heterogeneous with respect to shape, size, or other attributes.

The salt compositions may have various particle sizes. Additionally, the hollow particles may have various sizes of inner diameters and outer diameters. In embodiments, the rounded particles have an outer diameter from about 1 micron to about 1000 microns, or from about 1 micron to about 500 microns, or from about 1 micron to about 300 microns, or from about 3 microns to about 150 microns, or from about 5 microns to about 100 microns, or from about 10 microns to about 50 microns.

The aerosolizing and solidification may produce a wide range of particle morphologies. For example, the particles may be formed as aerosol particles that are formed in the free gas phase without any interaction with other particles or droplets (also called primary aerosol particles), or particles that are formed as they were subject to various transformations and interactions with other particles or droplets after being aerosolized (also called secondary aerosol particles). The rounded particles may be formed in a free gas phase, e.g., having enough time to assume a rounded shape (driven by surface tension) before solidifying. The rounded particles may also be formed in other shapes, such as drop shapes, e.g., having solidified prior to forming a wholly rounded shape. Particles of the salt compositions may have holes or cracks of various shapes (e.g., holes or cracks caused by overpressurization inside of particles that have solidified). In addition, the particles may have other surface features, such as wrinkles or fault lines (e.g., due to shrinkage from the particles cooling during the process, collision with other particles, equipment surfaces, etc.). The salt compositions may also include varying particle shapes resulting from the processing, such as splatters, coalesced particles, etc.

The methods may further include isolating a particle size range, e.g., by sieving the rounded particles. The methods may further include grinding and/or agglomerating the rounded particles. Larger particles may be screened out by gravitational settling (e.g., in a drift tube), or by other methods, such as in a cyclone. In embodiments, the large particles that are screened out may be recycled into the aerosolizing process. The salt compositions may be ground or milled. In embodiments, it may be ground or milled to a salt composition's desired particle size. Any suitable grinder or mill may be used in accordance with this invention. Grinding the rounded particles may advantageously increase surface area.

In embodiments, the salt compositions may have particle sizes of between about 20 mesh and about 100 mesh, or between about 35 mesh and about 100 mesh, or between about 35 mesh and about 90 mesh, or between about 35 mesh and about 80 mesh, or between about 35 mesh and about 60 mesh. It should be recognized that the particle sizes of the compositions may be selected to meet the particular end use application. "Pretzel grade" salt generally has a particle size that passes through a 35 mesh sieve, whereas "shaker grade" salt has a particle size that passes through between a 35 and a 60 mesh sieve. "Popcorn grade" salt has a particle size that passes through a 60 mesh sieve. Once ground, the salt composition may have less than about 10% of all granules, which are finer than 100 mesh. All mesh sizes are by U.S. standard sieve size.

A person of ordinary skill in the art will recognize that salt compositions of the present invention containing components in addition to salts, such as sodium chloride and/or a non-sodium chloride salt, may be prepared by several methods, including those described above. Additional methods include adding the additional components prior to heating the composition or adding the additional components after the composition has been heated, aerosolized, and/or ground. One skilled in the art will appreciate that the method of preparation depends upon the additional components to be included in the salt composition. For instance, some components, such as organic components, will be destroyed by the high melting temperatures and may cause off flavors in the resultant product or not retain the properties or characteristics desired for inclusion in the salt composition. Some components, such as inorganic components, may not be altered by the high melting temperatures and may advantageously be included prior to the heating step. An advantage to including additional components prior to the heating step is that the additional component will be incorporated into the salt compositions.

Figure 2:
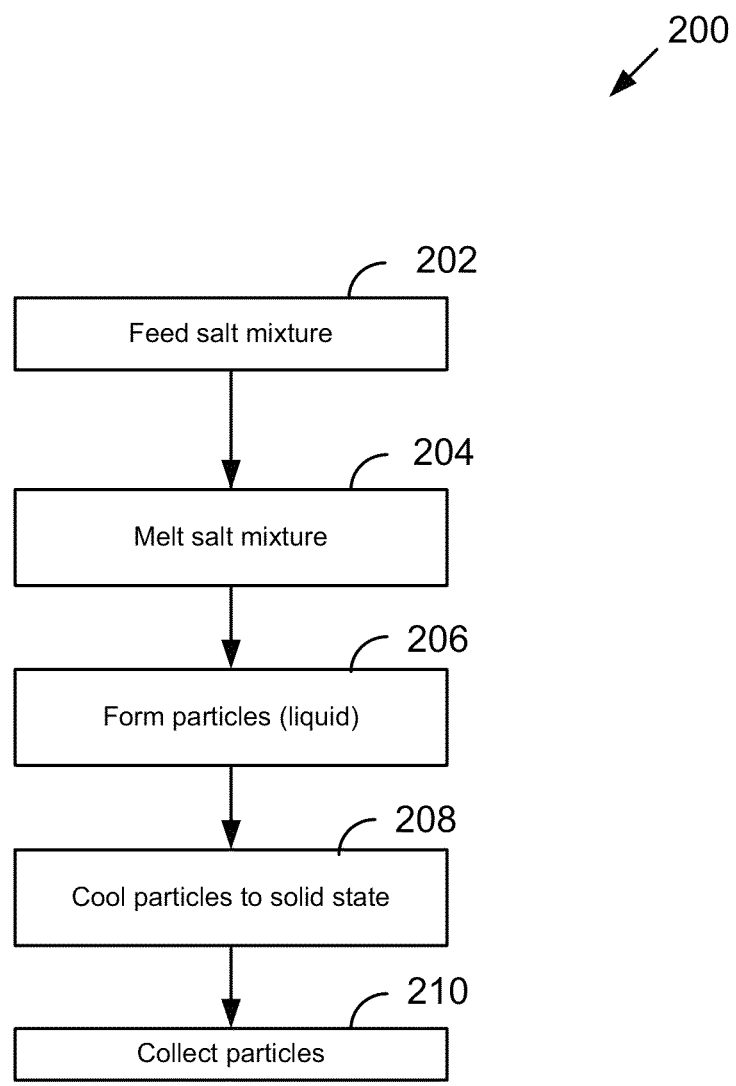

An exemplary flow chart 200 of the process is shown in FIG. 2. In FIG. 2, the process starts at step 202, when a salt mixture is fed to a heating apparatus, e.g., a furnace. In step 204, the mixture is melted. The mixture may include various components, and the components may be melted prior to, or after, they are combined. In embodiments, the mixture may be melted in a reservoir inside a furnace; for example, in a tube furnace at temperatures ranging up to about 1200° C.

In step 204, before or after melting the mixture, additional steps may occur, such as mixing. In step 206, liquid particles are formed. In embodiments, the liquid particles are formed by spraying or the use of a nebulizer to aerosolize the melted composition. In step 208, the aerosolized particles are cooled to form solidified particles. The particles have a homogeneous chemical composition, and the particles are amorphous or partially crystalline. In step 210, the particles are collected. In embodiments, the particles are collected using a collection unit.

Figure 23:
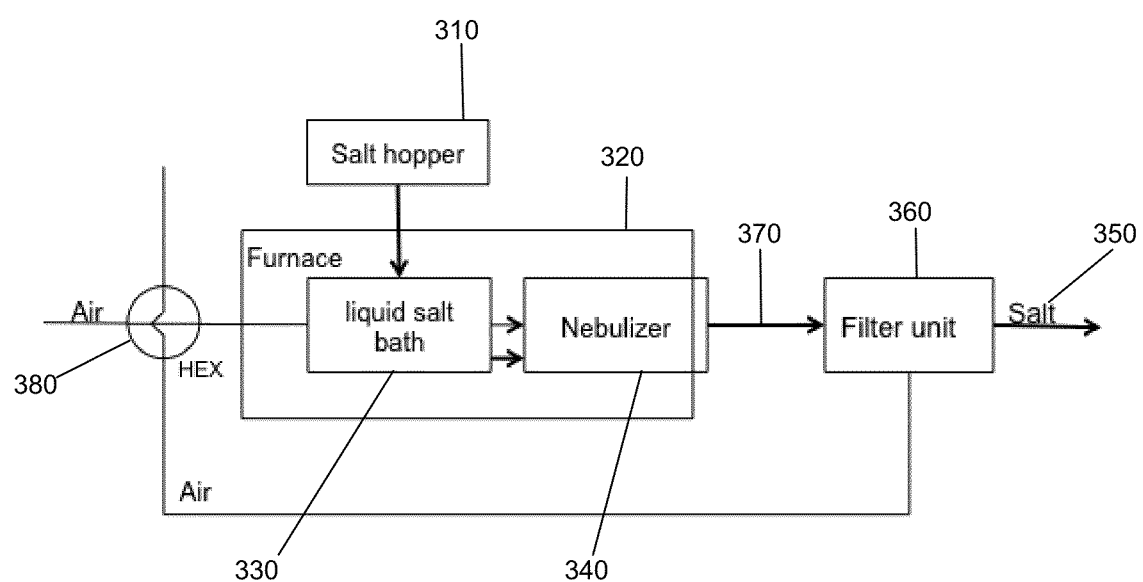
FIG. 23 is a flow diagram of a process of the present invention.

Another view of the process is illustrated in FIG. 23. Salt from a salt hopper 310 is fed to a furnace 320 where the salt is melted in a liquid salt bath 330. The molten liquid salt is fed to a nebulizer 340, where it is aerosolized and allowed to cool. The resulting particulate salt product 350 is filtered 360 from the hot air stream 370. The hot air stream 370 can be sent to a heat exchanger 380 to recover waste heat.

Methods of Use

The salt compositions of the present invention may be used as a salt substitute in food products, as a table salt, or in spice mixtures. Additionally, the salt compositions of the present invention can be used in commercial food manufacturing processes in order to reduce the proportion of sodium in the product while maintaining the salty taste. For example, embodiments may include a food material and rounded salt composition particles. The food product may be a fried food product, a baked food product, or an extruded food product. The food product may also be selected from soups, sauces, baked goods, meat products, poultry products, snack products, dairy products, and breakfast cereals. Further representative food products include vegetables, fish, cheese, breads, frozen foods, canned foods and snack foods, such as potato chips, pretzels, peanuts, seeds, corn chips, tortilla chips, popcorn, crackers and bread sticks. The salt compositions may be applied to the foods in amounts sufficient to provide the saltiness desired. The food product may further include at least one additive, and the additive may be selected from an antioxidant, a dietary supplement, a phosphate, an anti-caking agent, a colorant, a salt enhancer, an organic acid, an amino acid, an amino acid derivative, a sugar, a sugar derivative, and combinations thereof.

In embodiments, the food product may be heated to a temperature from about 50° C. to about 250° C. Without being bound by theory, it is believed that the food product including a food material and salt compositions of the present disclosure may be heated without imparting any significant effect on the quality or taste of the food product due to the lack of organic components. As explained herein, in prior art salt compositions, organic components were added to mask or reduce off-flavors (e.g., metallic/bitter tastes of potassium or magnesium). Prior art food products were unable to be heated after the addition of prior art salt compositions because heating the organic components in the prior art salt compositions caused the organic components to degrade, thereby causing an unsatisfactory taste or off-flavor. Thus, advantageously, the salt compositions of the present invention may allow the heating of food products after the addition of the presently disclosed salt compositions, without losing the advantageous attributes of the present salt compositions (e.g., improved taste or reduced sodium content).

A person of ordinary skill in the art will recognize that the taste aspect is very important with food production. Foods, in which the sodium content is reduced, frequently lose their taste and are regarded as tasteless by the consumer. A bitter character also frequently arises due to the use of other salts. Use of the salt compositions of the invention minimize, if not eliminate, these effects.

The following examples are intended to illustrate and explain exemplary embodiments. Embodiments of the disclosure, therefore, should not be limited to any of the details in these examples.

EXAMPLES

Example 1

Prior Art Salt Compositions

Figure 3:
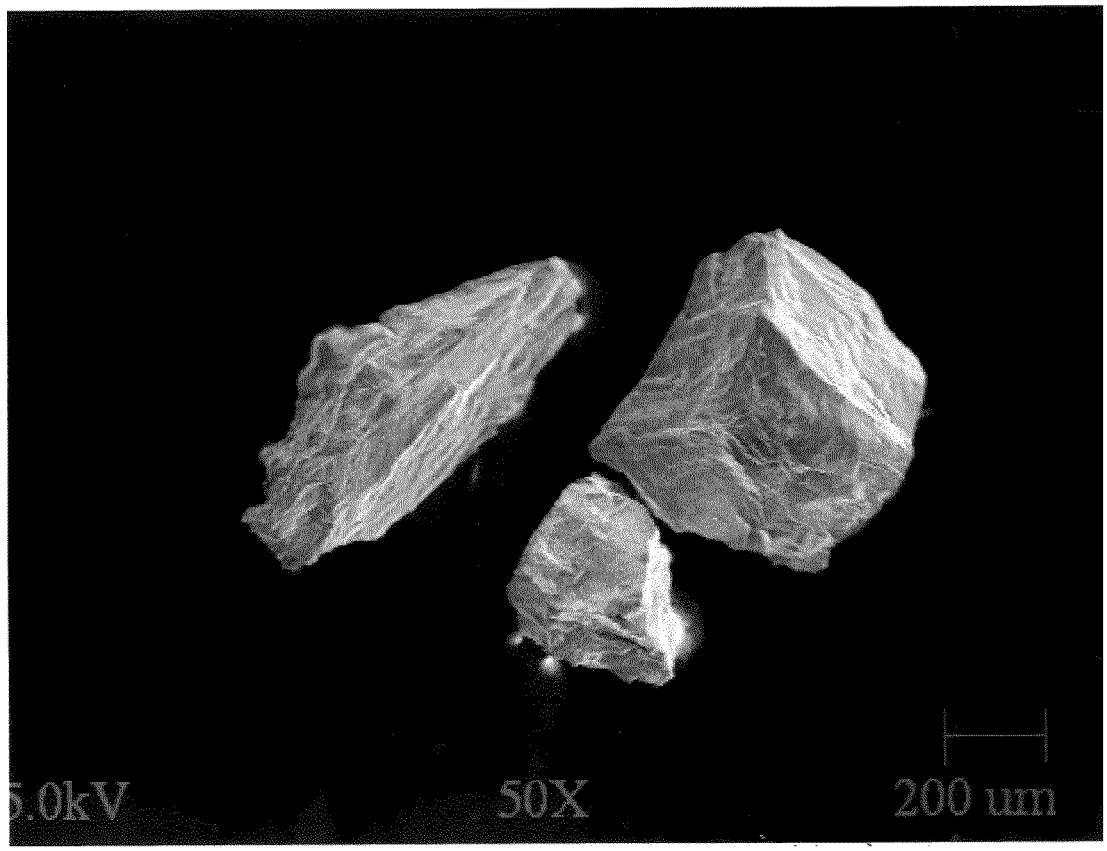

FIG. 3 shows a scanning electron microscope (SEM) image of the composition of NaCl and KCl blends known in the art. As described herein, prior art salt compositions are sodium chloride or a mixture of sodium chloride and non-sodium chlorides; for example, sodium chloride and potassium chloride.

The prior art salt composition of FIG. 3 was made as follows. Powdered potassium chloride was mixed in a ratio of 1:1 with powdered sodium chloride. The mixture was then heated in a muffle furnace to a temperature of 900° C. for 15 minutes in small crucibles. The mixture melted to a clear liquid and then cooled in the crucibles. The melted composition cooled into a solid form and was ground in an Udy Cyclone Mill through a 1 mm screen (UDY Corporation, 201 Rome Court, Fort Collins, Colo. 80524).

A SEM is a type of electron microscope that produces images of a sample by scanning over it with a high energy focused beam of electrons. The electrons interact with electrons in the sample, producing secondary electrons, back-scattered electrons, and characteristic X-rays that can be detected and that contain information about the sample's surface topography and composition. The electron beam is generally scanned in a raster scan pattern, and the beam's position is combined with the detected signal to produce an image. As can be seen, the prior art composition of FIG. 3 has a crystalline structure without a rounded shape.

Figure 4:
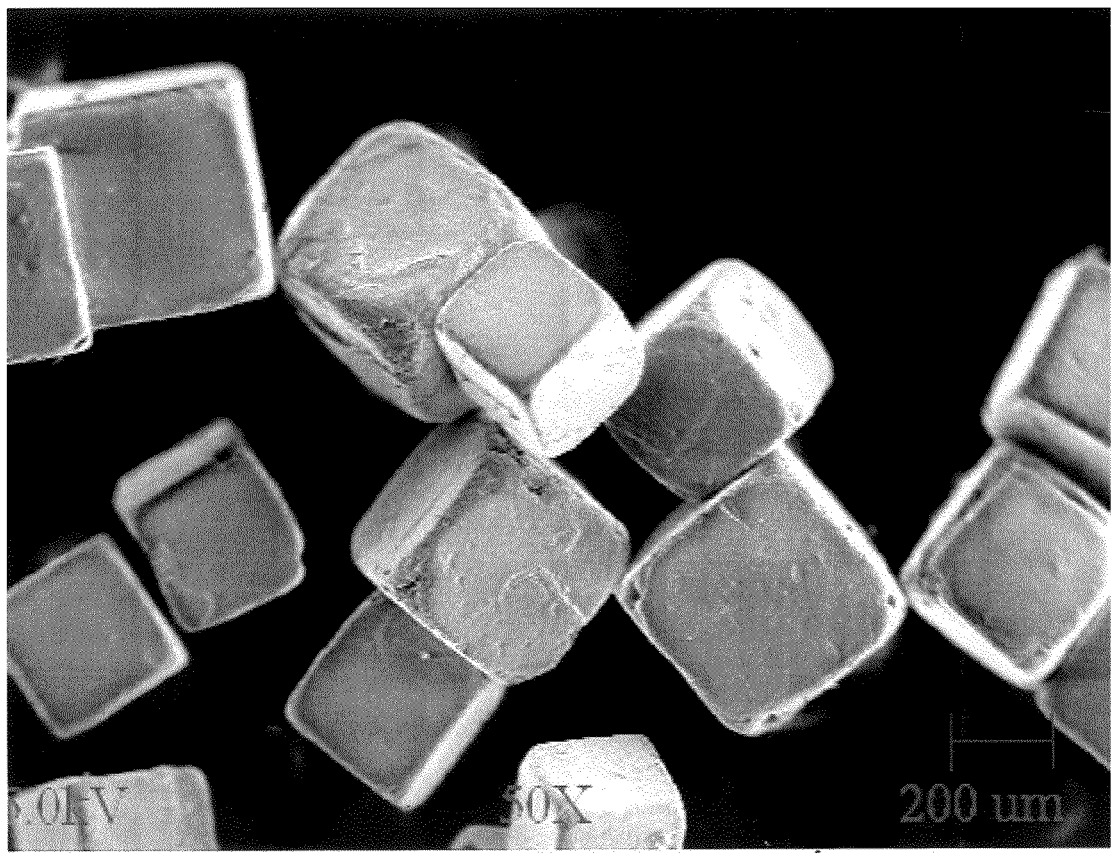

FIG. 4 shows a SEM image of NaCl. As is known in the art, in solid sodium chloride, each ion is surrounded by six ions of the opposite charge as expected on electrostatic grounds. The surrounding ions are located at the vertices of a regular octahedron. In the language of close-packing, the larger chloride ions are arranged in a cubic array whereas the smaller sodium ions fill all the cubic gaps (octahedral voids) between them. This same basic structure is found in many other compounds and is commonly known as the halite or rock-salt crystal structure. It can be represented as a face-centered cubic (fcc) lattice with a two-atom basis or as two interpenetrating face centered cubic lattices. The first atom is located at each lattice point, and the second atom is located halfway between lattice points along the fcc unit cell edge. As shown in FIG. 3, the crystalline structure of salt is maintained when sodium chloride is combined with potassium chloride to make prior art salt compositions.

Figure 5:

FIG. 5 shows a SEM image of KCl. KCl is a metal halide salt composed of potassium and chlorine. In its pure state, it is odorless and has a white or colorless vitreous crystal appearance, with a crystal structure that cleaves easily in three directions. Potassium chloride crystals are face-centered cubic. As shown in FIG. 3, the crystalline structure of salt is maintained when sodium chloride is combined with potassium chloride to make prior art salt compositions.

Example 2

Characterization of Present Salt Compositions

Figure 6A:
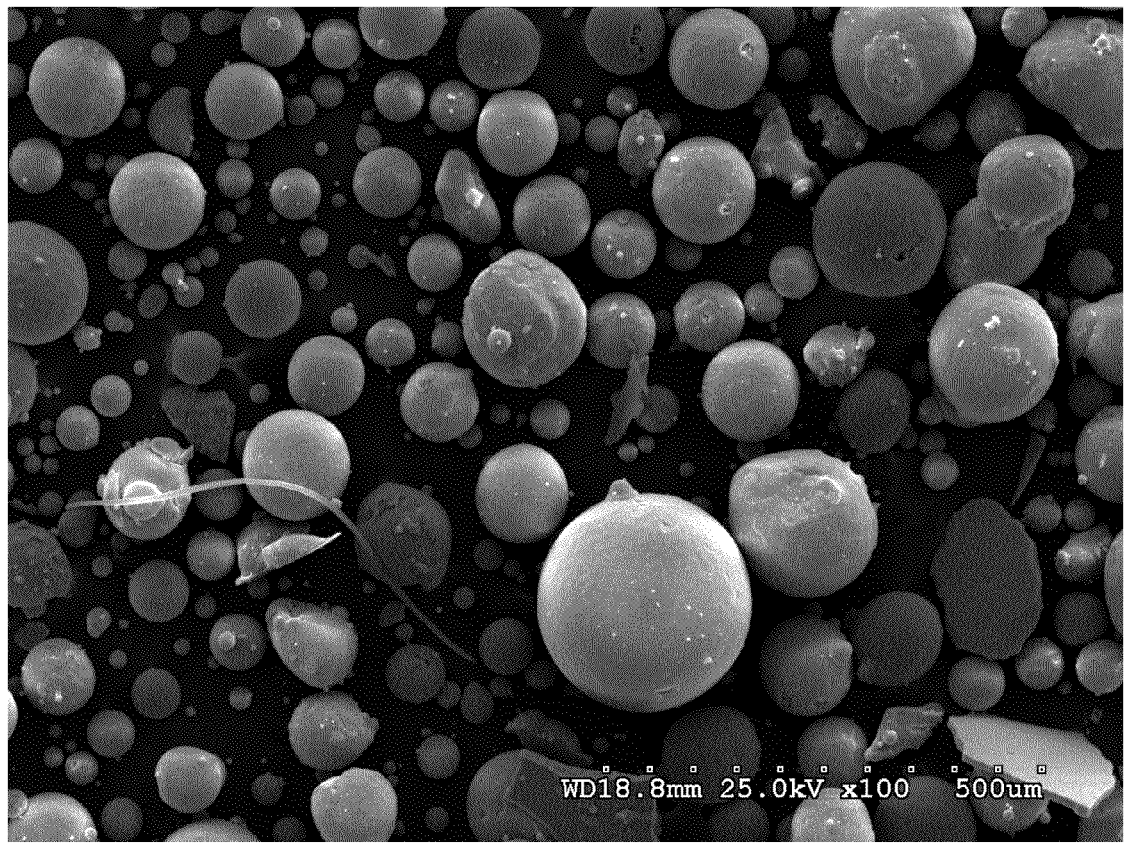
Figure 6B:
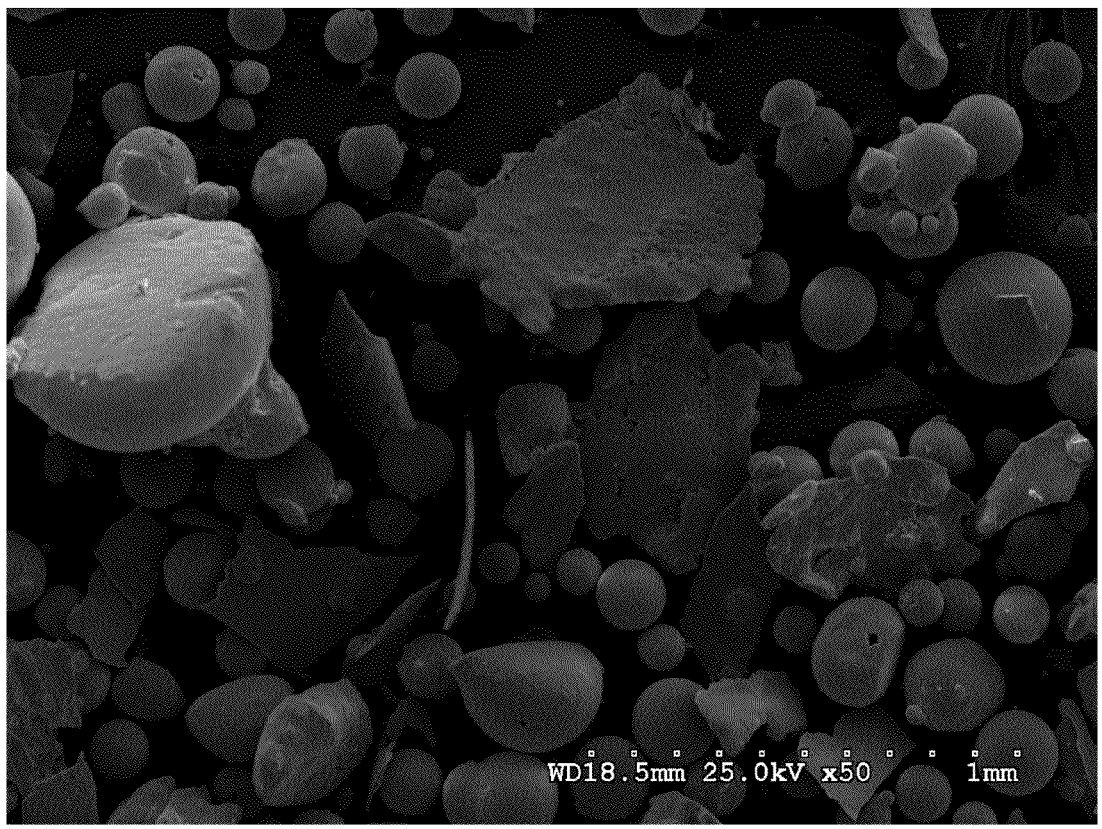
Figure 6C:
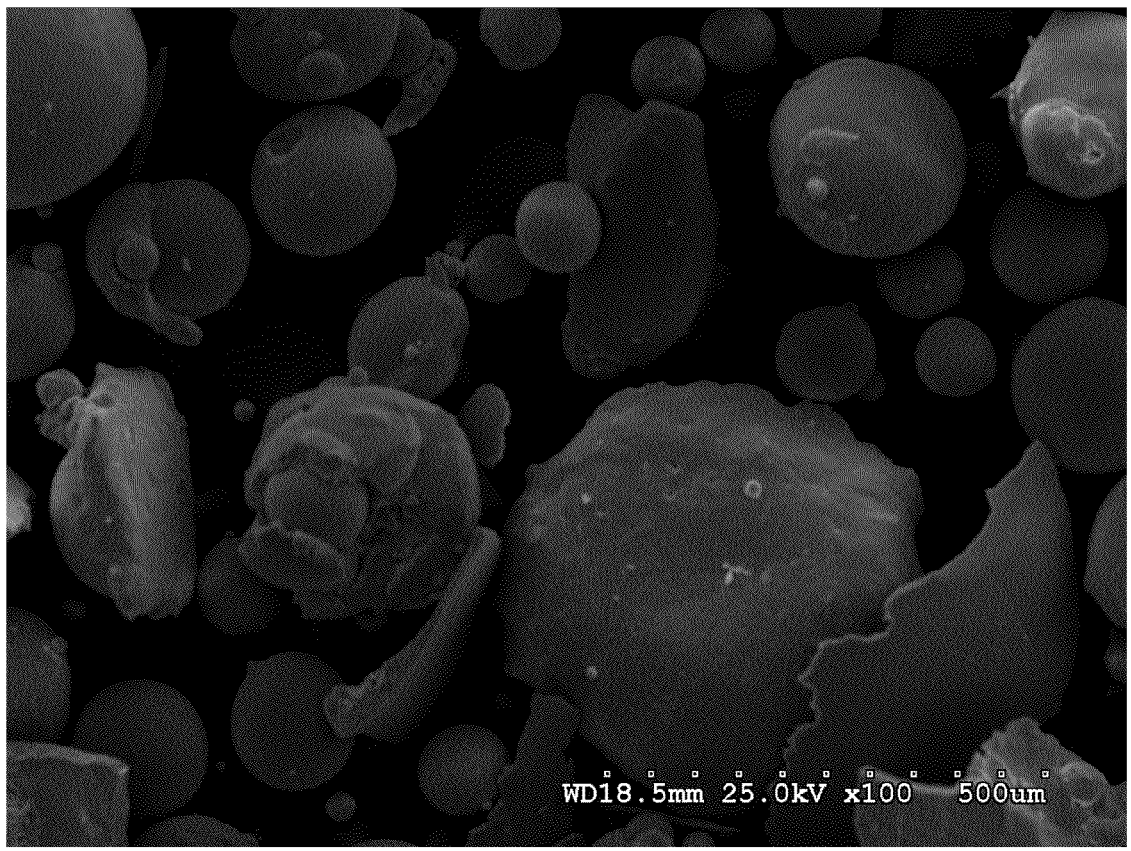
Figure 6D:
Figure 7:
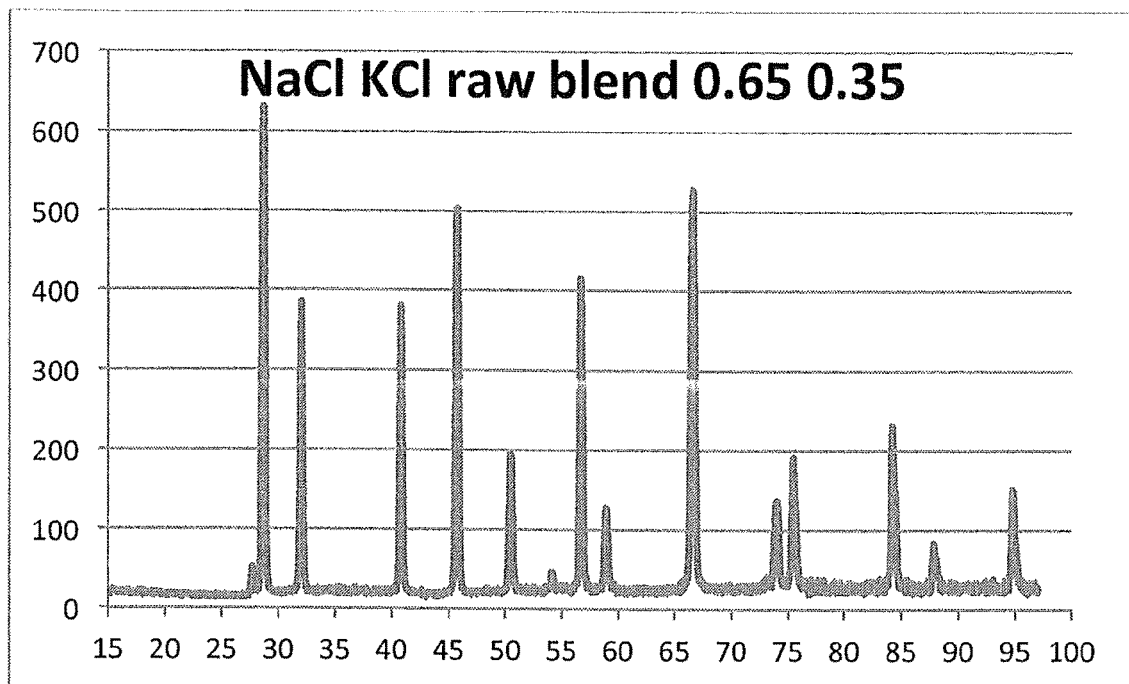
Figure 8:
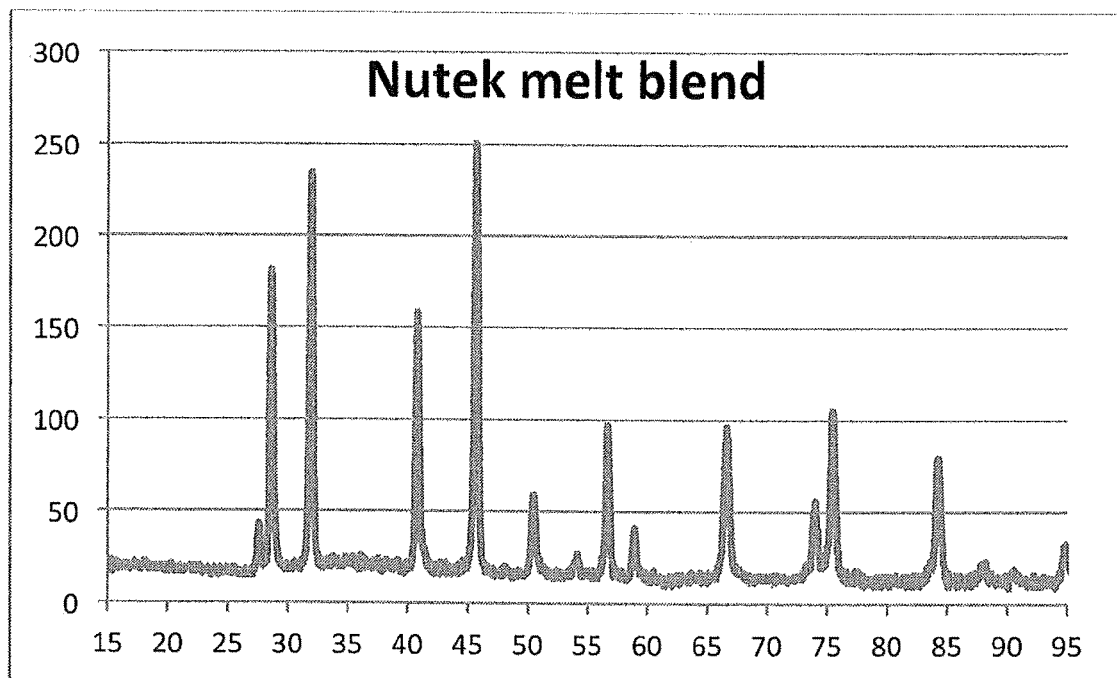
Figure 9:
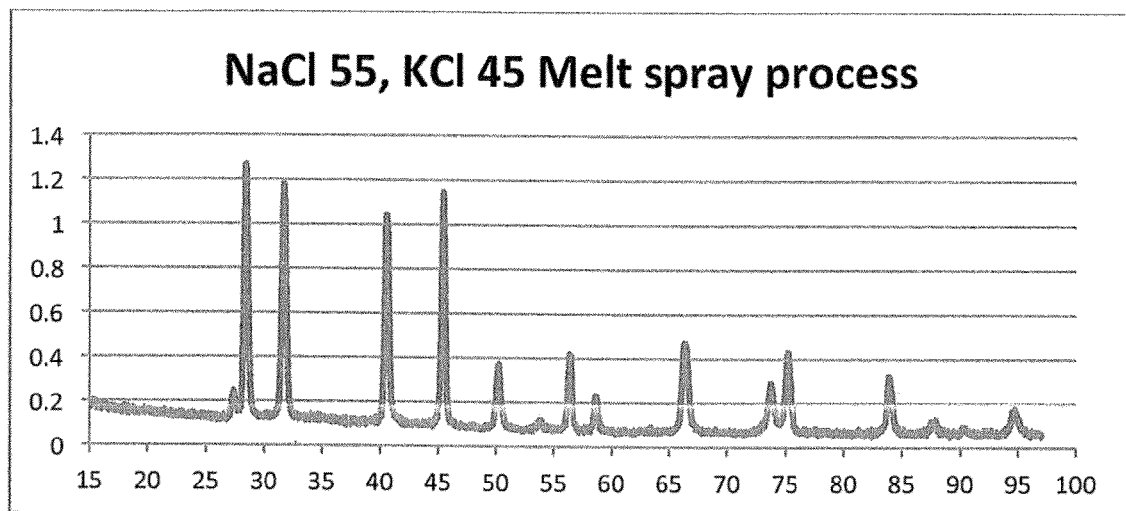
Figure 10:
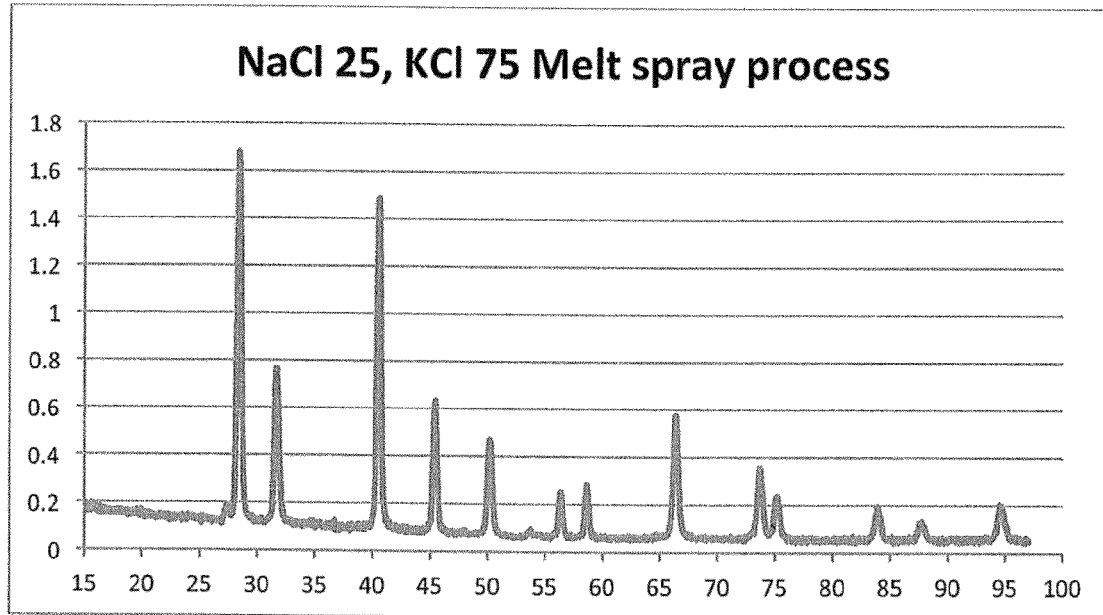
Figure 11:
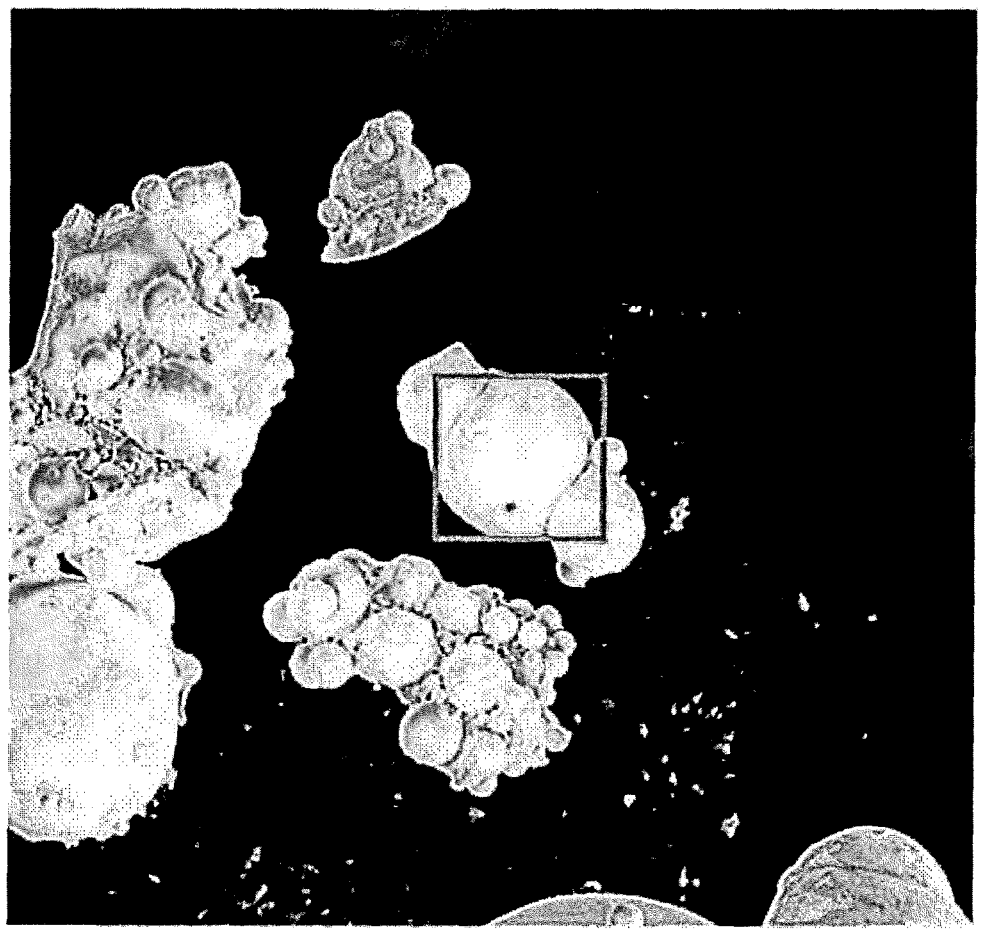
Figure 12:
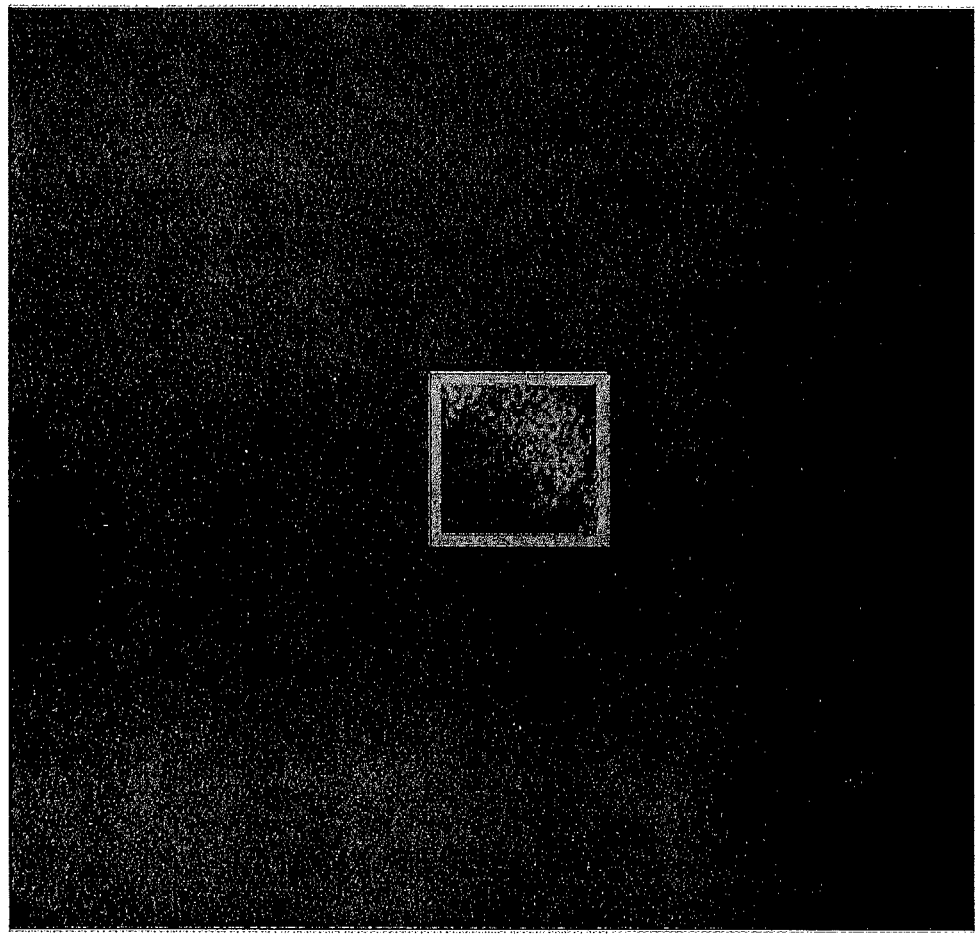
Figure 13:
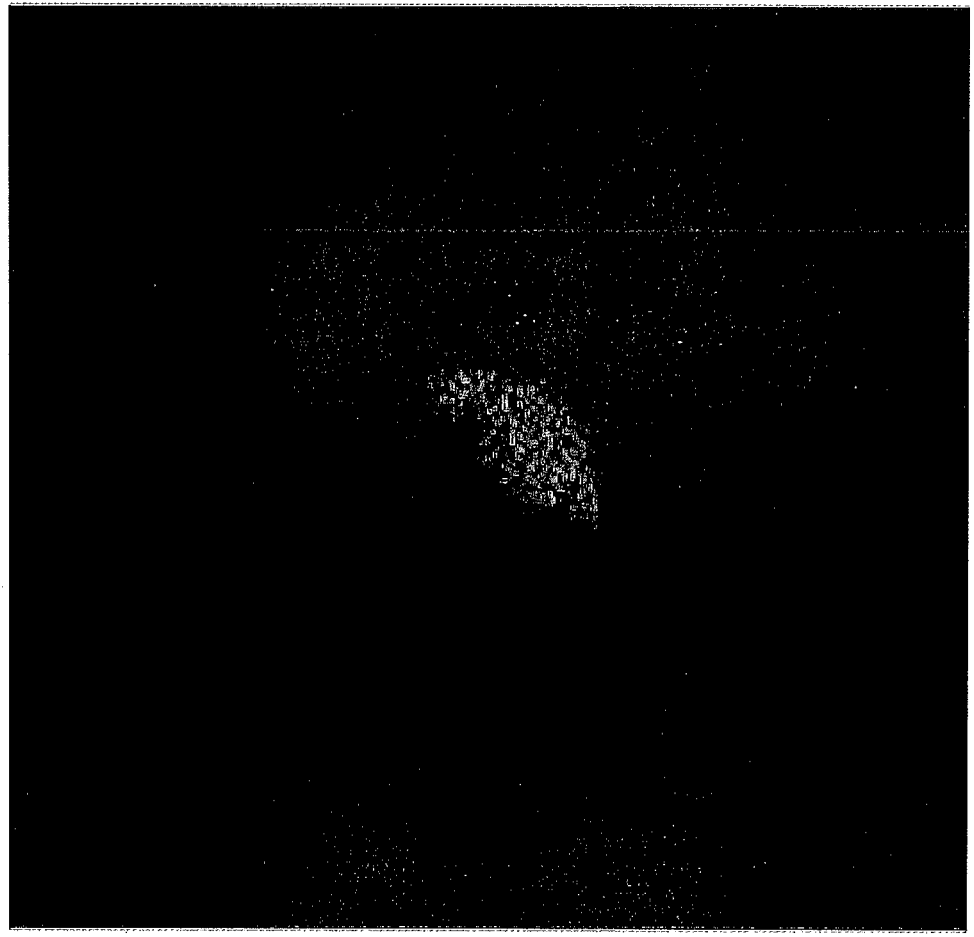
Figure 14:
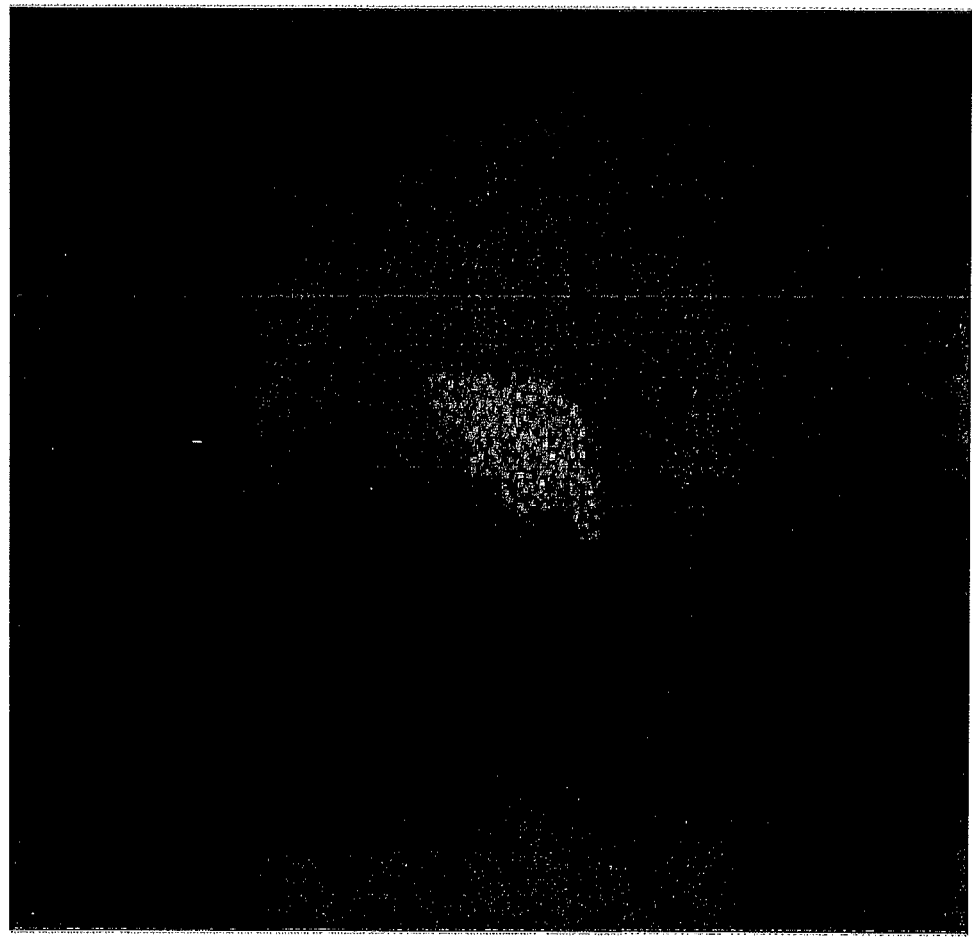

FIG. 6A shows a SEM image of a NaCl and KCl composition of the present invention. The exemplary composition of NaCl and KCl shown in FIG. 6A was made by mixing 55 wt % NaCl and 45 wt % KCl, melting the mixture to form a homogenous liquid composition, and aerosolizing the liquid mixture with a pneumatic nebulizer. The liquid aerosolized particles cooled quickly after exiting the nebulizer, prior to touching a surface.

In FIG. 6A, it is shown that the compositions of the present invention contain a new kind of salt composition particle. In contrast to the prior art crystallized salt particles shown in FIG. 3, the particles of the present invention are rounded and don't have a typical crystal surface (e.g., lack crystal faces). Although Applicants are unsure of the exact mechanism creating the rounded shape, Applicants theorize that the fast cooling rate prevents the formation of a regular cubical shaped salt particle.

FIG. 6B shows a SEM image of a NaCl and KCl composition of the present invention. In particular, FIG. 6B shows a SEM image at 50× magnification. In FIG. 6B, a variety of particles shapes and sizes is apparent. The exemplary salt composition includes rounded particles, and other morphologies.

FIG. 6C shows a SEM image of a NaCl and KCl composition of the present invention. In particular, FIG. 6C shows a SEM image at 100× magnification. In FIG. 6C, a variety of particles shapes and sizes is apparent. For example, rounded particles, agglomerated particles, and broken particles are present.

FIG. 6D shows a SEM image of a NaCl and KCl composition of the present invention. In particular, FIG. 6D shows a SEM image at 1000× magnification. In FIG. 6D, a piece of a broken particle is shown, along with a rounded particle. The rounded particle of the salt composition shows an absence of crystal faces or crystalline structure.

The rounded particles provide advantages over prior art salt compositions. For example, the increased surface area advantageously increases the amount of surface area that intercepts taste receptors, thereby increasing the salty taste without increasing the amount of sodium in the composition. In addition, the rounded particles may be advantageously able to withstand higher processing temperatures necessitated by the preparation of food products. For example, food products combined with the salt compositions of the present invention may be able to be baked, fried, or extruded without reducing or eliminating advantageous aspects associated with the present compositions.

Example 3

Characterization of Present Salt Compositions

The salt composition made in Example 2 was analyzed to determine its inherent properties, and its inherent properties were compared with those of prior art compositions.

In particular, using x-ray diffraction (XRD) techniques, a salt composition of a raw blend of 65 wt % NaCl and 35 wt % KCl was determined to have a typical diffraction pattern (FIG. 7). A 50 wt % NaCl and KCl blend was heated in a muffle furnace, then solidified, ground, and analyzed with XRD to determine its diffraction pattern, as shown in FIG. 8.

In comparison to a dry mixture of sodium chloride and potassium chloride (FIG. 5), the XRD analysis of the melted blend prior art composition (FIG. 8) was similar to the simple blend of NaCl and KCl that was not heated (FIG. 7). These results confirmed that the heating process did not change the underlying spectra of the sodium chloride and potassium chloride.

Next, XRD analysis was done on compositions of the present invention. FIG. 9 shows an X-ray diffraction analysis of a 55 wt % NaCl and 45 wt % KCl composition of the present invention, made using a nebulizer to create rounded particles. FIG. 10 shows an X-ray diffraction analysis of a 25 wt % NaCl and 75 wt % KCl composition of the present invention, made using a nebulizer to create rounded particles. Comparison of these results confirmed that the aerosolizing process did not change the underlying spectra of the sodium chloride and potassium chloride. However, the aerosolizing resulted in rounded particles.

Example 4

Characterization of Present Salt Compositions

The composition of the present invention was analyzed using an energy-dispersive X-ray spectroscopy analysis and electron imaging.

FIG. 11 shows an energy-dispersive X-ray spectroscopy analysis of a 55 wt % NaCl and 45 wt % KCl composition of the present invention. FIG. 12, FIG. 13, and FIG. 14 show an energy-dispersive X-ray spectroscopy analysis of Na, Cl, and K, respectively, in a 55 wt % NaCl and 45 wt % KCl composition of the present invention. In FIG. 12, the dots visible within the square in the picture are Na. In FIG. 13, the dots visible within the square in the picture are Cl. In FIG. 14, the dots visible within the square in the picture are K. Comparison of these images showed that the composition has homogeneously co-mingled sodium, chloride, and potassium components. This unique homogenous co-mingled amalgamation of sodium and potassium ions allows these ions to be presented to the taste buds in a way that the bitterness of potassium ion is eliminated while keeping the saltiness attribute.

Example 5

Differential Thermal Analysis data for exemplary salt compositions

Figure 15:
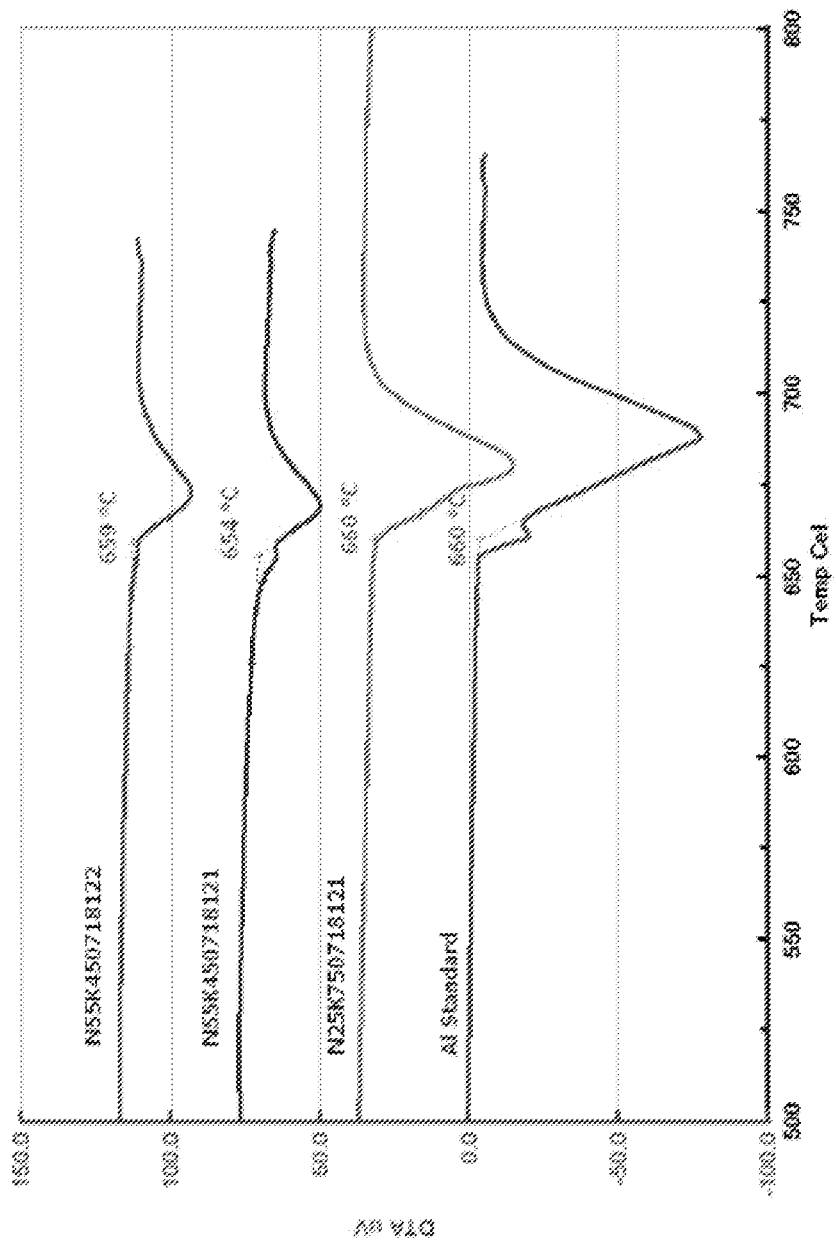
Figure 16:
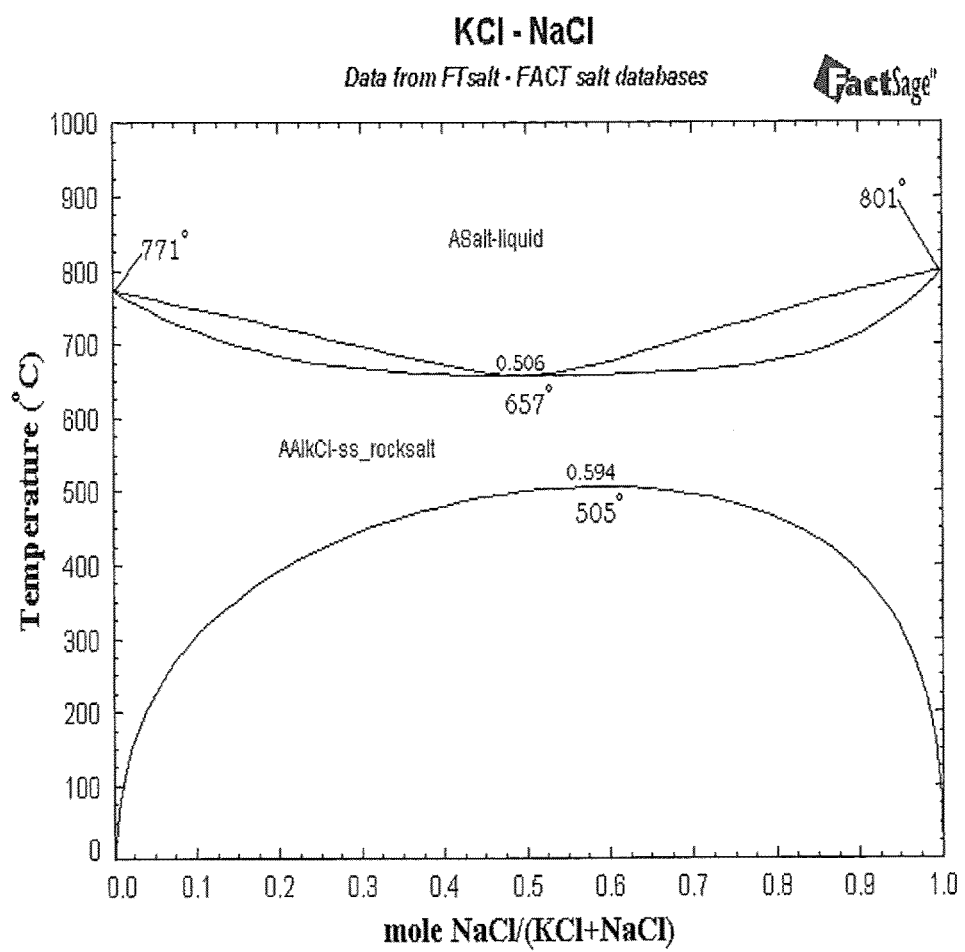

Differential Thermal Analysis (DTA) was collected to show the melting behaviors of three NaCl/KCl salt samples. The samples were analyzed from room temperature to 760° C., in argon atmosphere. FIG. 15 shows DTA curves of exemplary compositions of the present invention together with an aluminum standard. The melting points of the salt samples were determined to be 660° C. for a 25 wt % Na 75 wt % K sample, 654° C. for a 55 wt % Na 45 wt % K sample, and 659° C. for a 55 wt % Na 45 wt % K sample, which corresponds to the phase diagram of NaCl/KCl, as shown in FIG. 16. The melting point of the aluminum standard was 660° C.

Example 6

Size Distributions

Figure 17A:
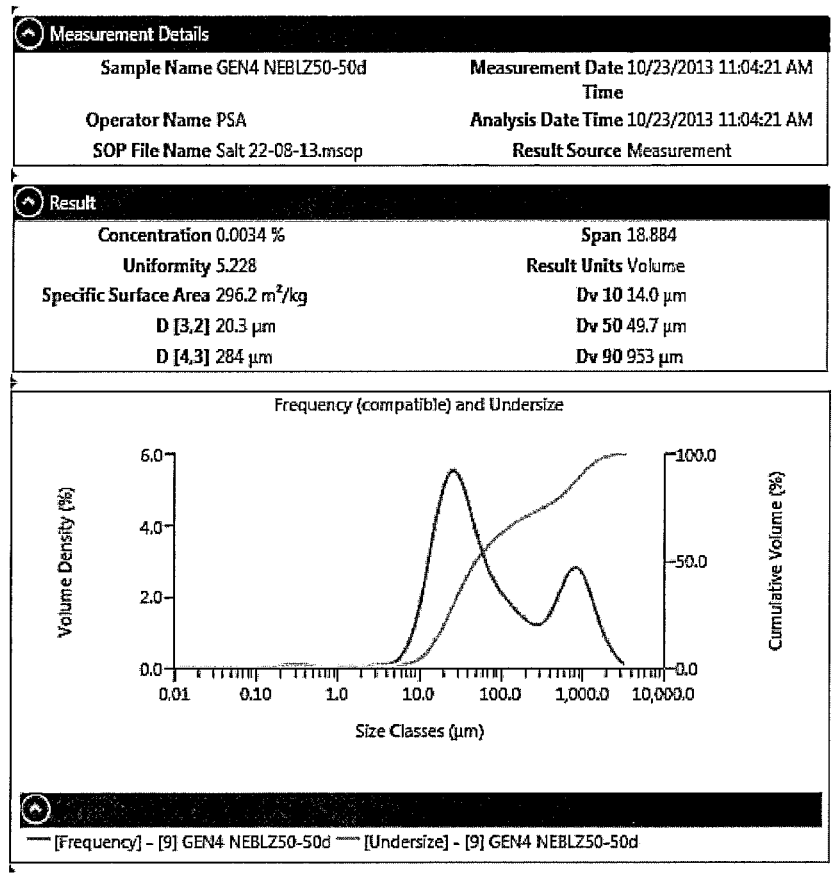
Figure 18A:
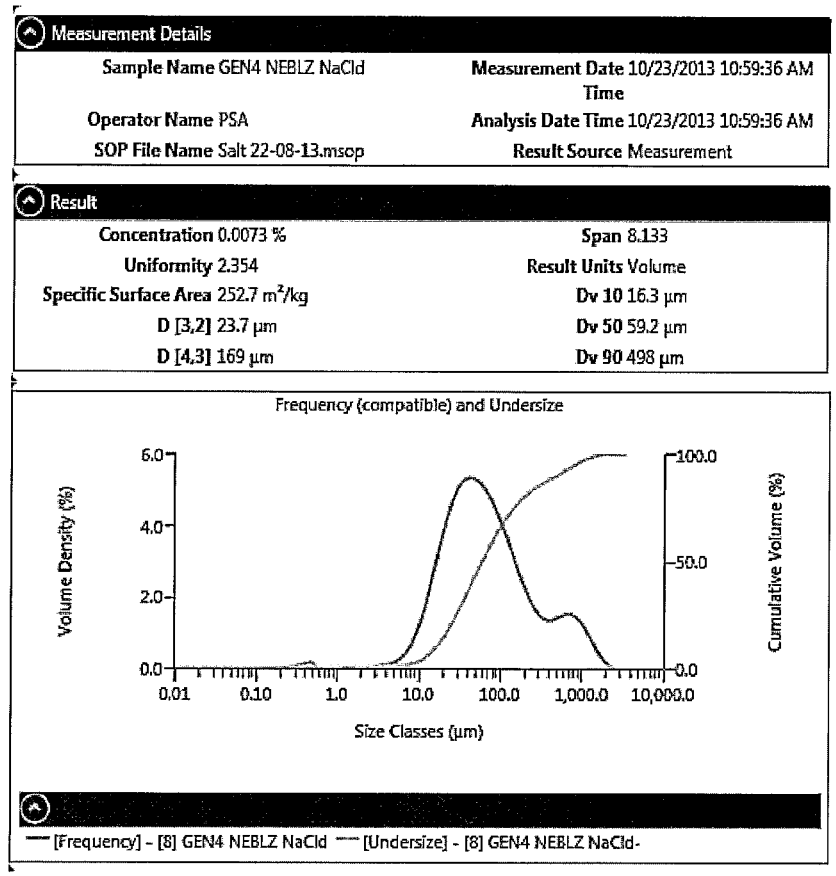

FIGS. 17A-17B (NaCl/KCl blend with 50 wt % Na/50 wt % K) and 18A-18B (100% NaCl) illustrate size distributions for salt compositions in accordance with the present invention. The particle sizes are predominantly (about 90% or more) in the range of about 1 µl to about 1000µ, and with a major peak (about 60% or more) in the range of about 3µ to about 150µ. It is believed that the second peak (around 1000µ) illustrated in the two graphical size distributions (FIGS. 17A and 18A) are due to the hygroscopic nature of the salt which results in clumping.

Example 7

Energy Disruptive X-Ray

Figure 19A:
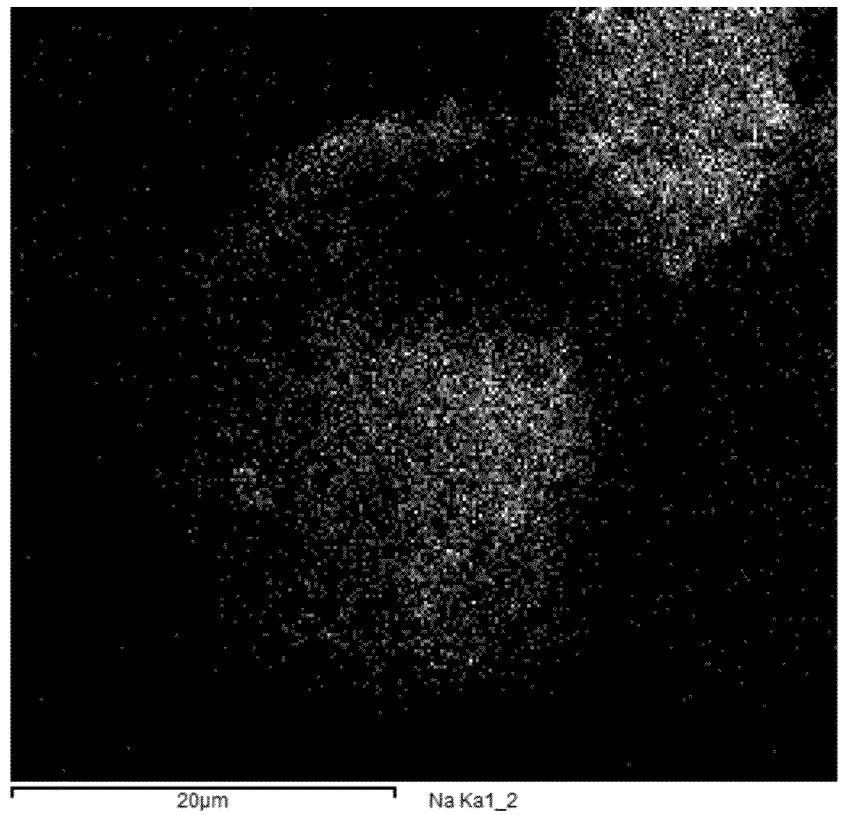
FIGS. 19A-19C show energy dispersive x-ray images of a blend of 50 wt % NaCl/50 wt % KCl in accordance with the present invention.
Figure 19B:
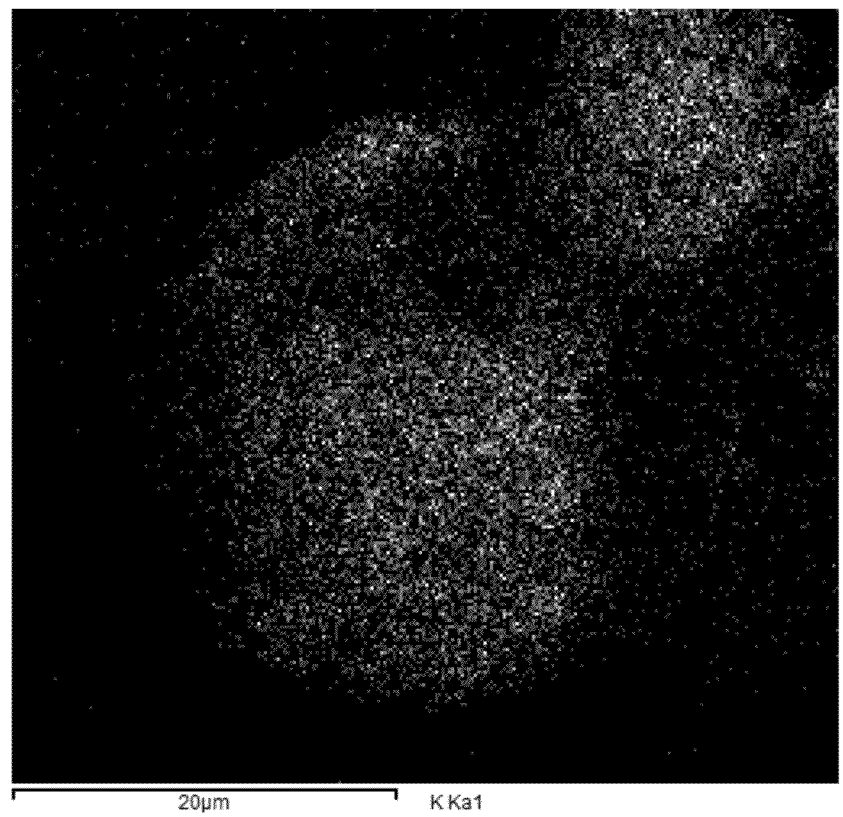
Figure 19C:
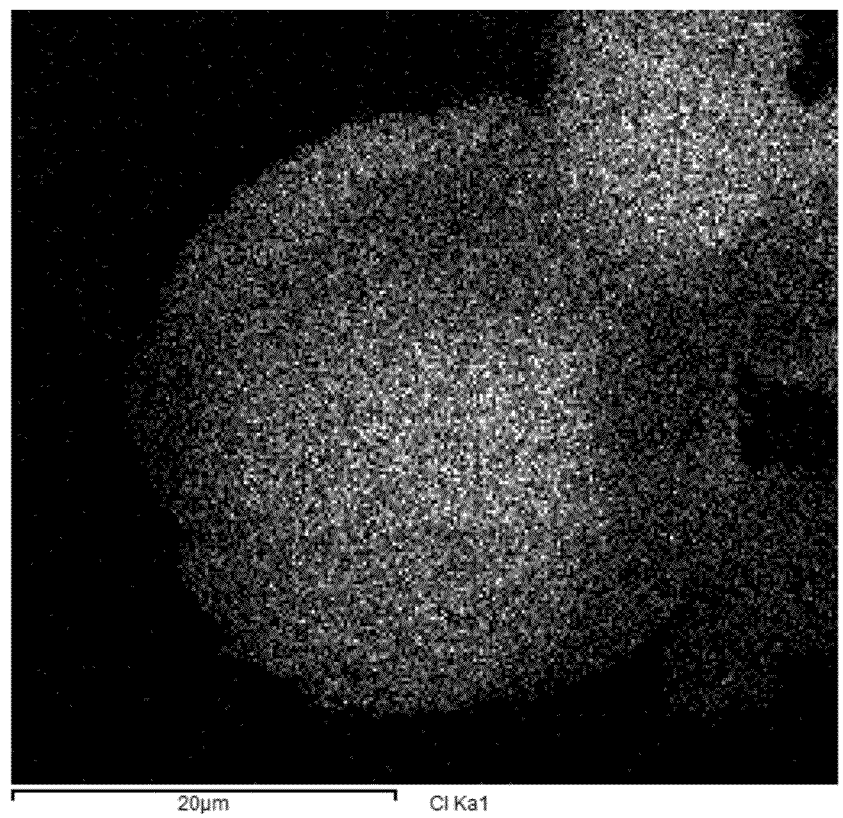

FIGS. 19A-19C are energy disruptive x-ray images for blends of 50 wt % NaCl/50 wt % KCl in accordance with the present invention. The blend was produced in a manner analogous to Example 2. These images illustrate that the sodium ions and non-sodium ions (e.g., potassium ions) are well dispersed and in close proximity to each other on the particles of the present invention. FIG. 19A shows the location of sodium ions as light spots on the salt particles. FIG. 19B shows the location of potassium ions as light spots on the salt particles. FIG. 19C shows the location of chloride ions as light spots on the salt particles. It is believed that the close proximity of sodium and potassium ions on the salt particles helps mask the bitter, metallic taste commonly associated with the potassium, resulting in a low-sodium salt substitute with desirable taste and other characteristics consistent with regular table salt. In the embodiment illustrated in this example, the sodium chloride and the non-sodium chloride salt (KCl) are blended before melting and aerosolizing in order to achieve the close proximity and unique homogenous co-mingling of the sodium ions and the non-sodium ions (e.g., potassium ions). This is a particular advantage of the present invention.

Example 8

Characterization of 50/50 Salt Composition

Figure 20A:
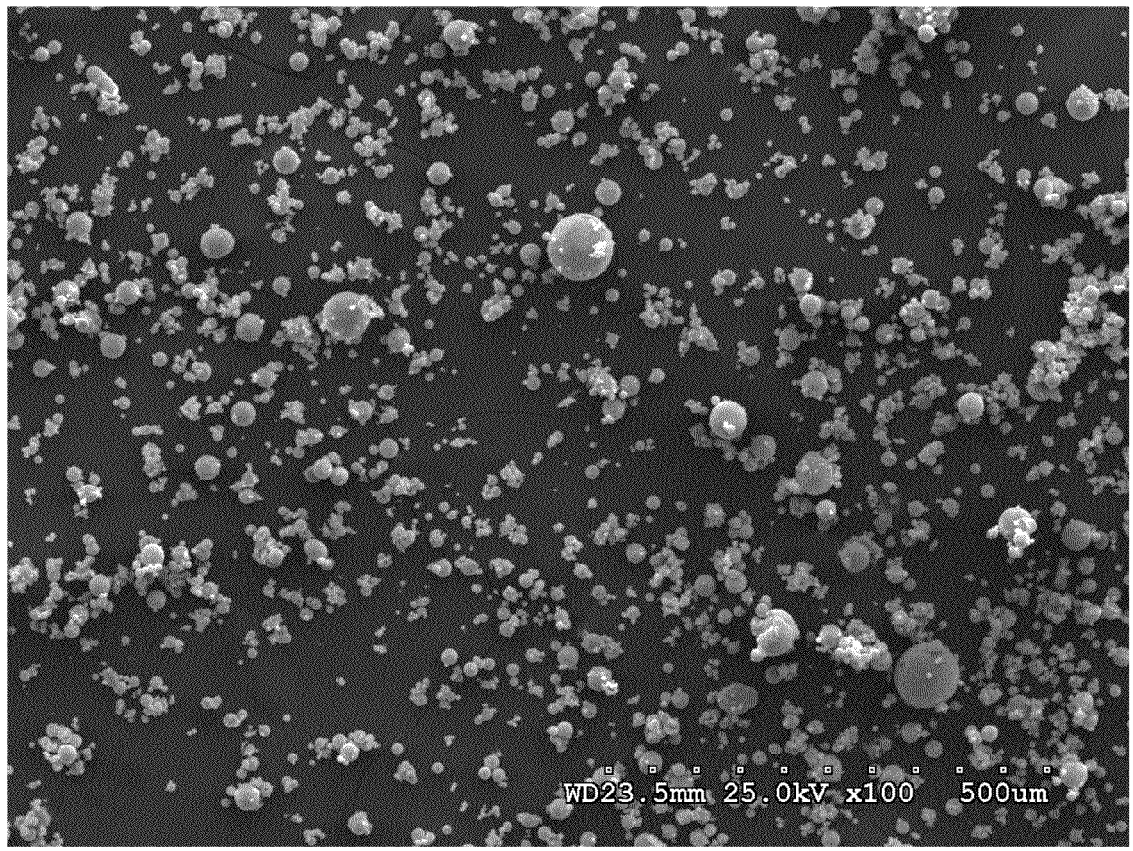
FIGS. 20A-20D show scanning electron microscope images of a blend of 50 wt % NaCl and 50 wt % KCl of the present invention.

FIG. 20A shows a SEM image of a NaCl and KCl composition of the present invention. The exemplary composition of NaCl and KCl shown in FIG. 20A was made by mixing 50 wt % NaCl and 50 wt % KCl, melting the mixture to form a homogenous liquid composition, and aerosolizing the liquid mixture with a nebulizer. The liquid aerosolized particles cooled quickly after exiting the nebulizer, prior to touching a surface.

In FIG. 20A, it is shown that the compositions of the present invention contain a new kind of salt composition particle. In contrast to the prior art crystallized salt particles shown in FIG. 3, the particles of the present invention are rounded and don't have a typical crystal surface (e.g., lack crystal faces).

Figure 20B:
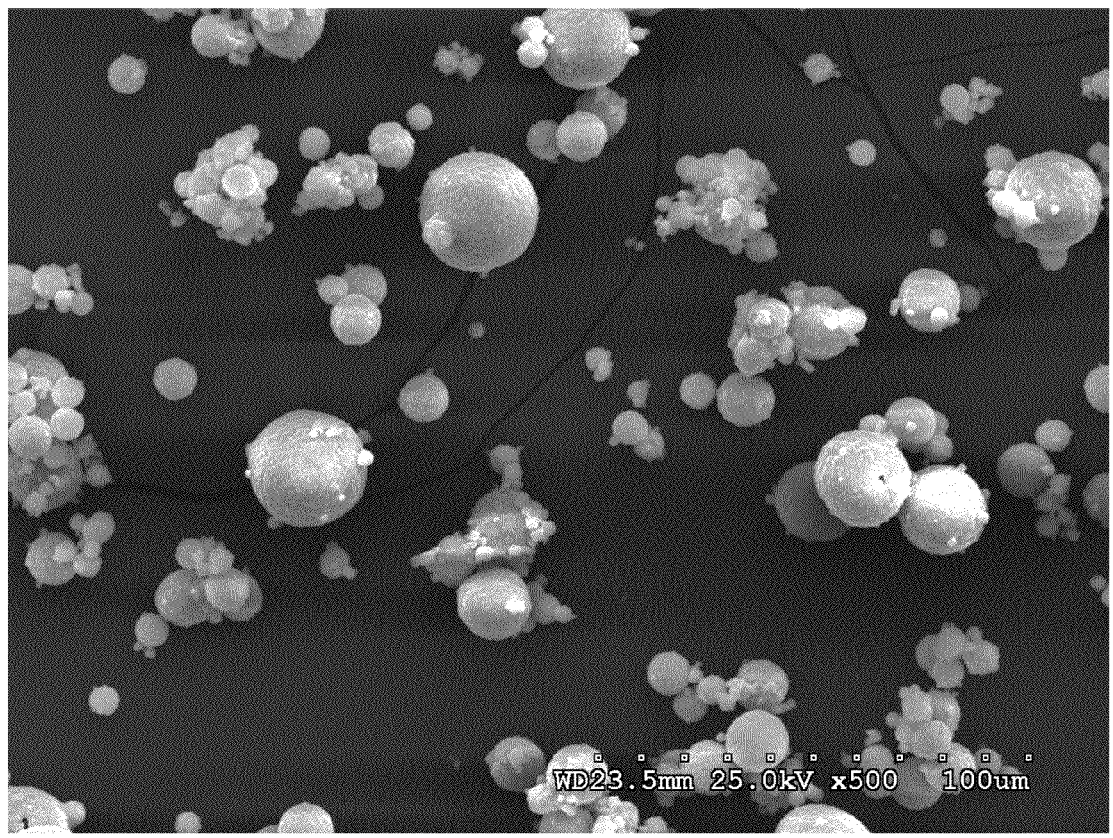

FIG. 20B shows a SEM image of a NaCl and KCl composition of the present invention. In particular, FIG. 20B shows a SEM image at 500× magnification. In FIG. 20B, most of the particle shapes are sphere-like. The exemplary salt composition predominantly includes rounded particles.

Figure 20C:
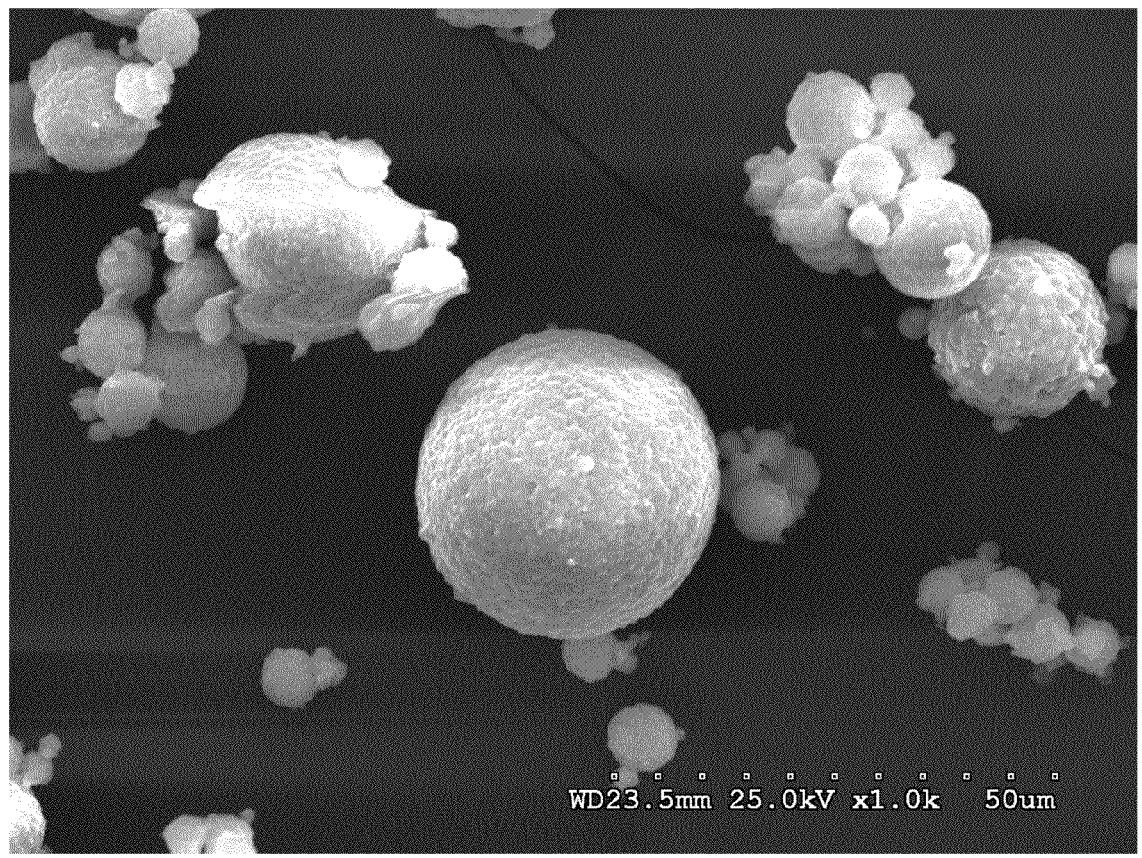

FIG. 20C shows a SEM image of a NaCl and KCl composition of the present invention. In particular, FIG. 20C shows a SEM image at 1000× magnification. In FIG. 20C, a variety sizes are apparent. Most of the particle shapes are rounded, and some of the rounded particles are agglomerated together. Some broken particles are present. In addition, the surface of sphere-like particles can be viewed.

Figure 20D:
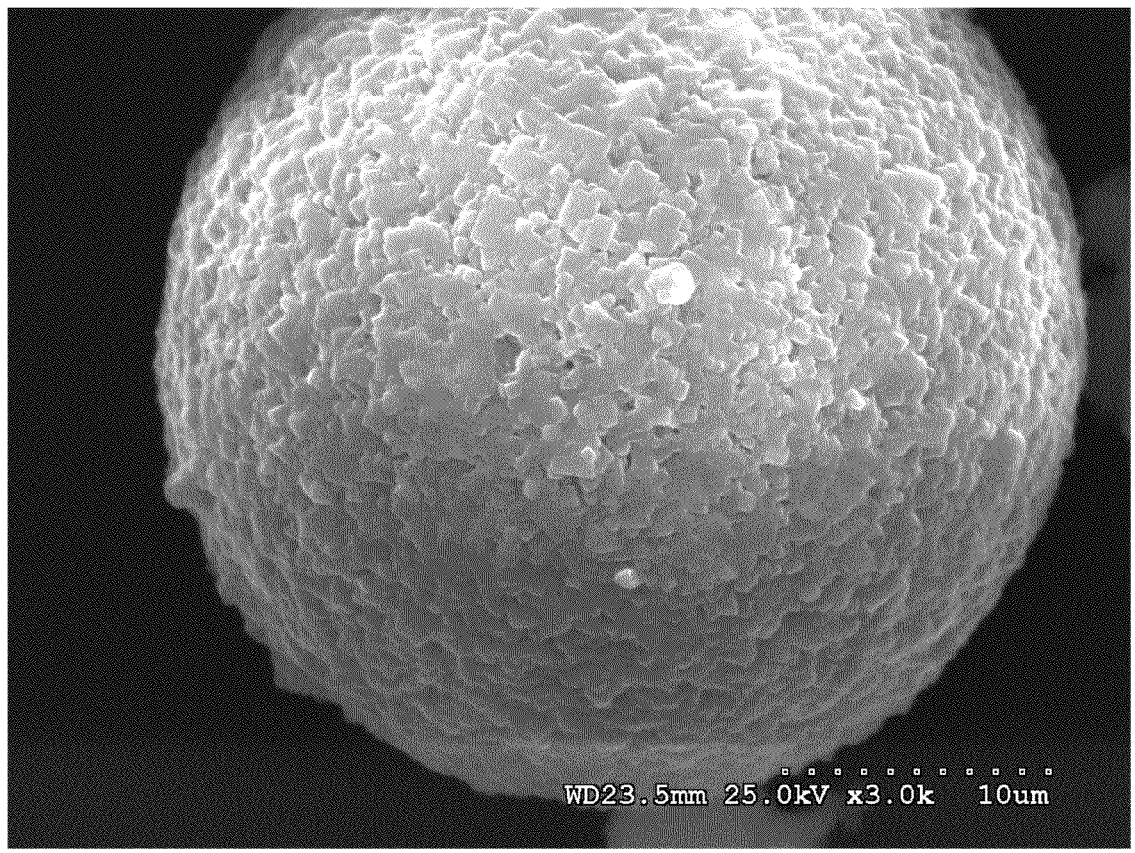

FIG. 20D shows a SEM image of a NaCl and KCl composition of the present invention. In particular, FIG. 20D shows a SEM image at 3000× magnification. In FIG. 20D, the surface of the sphere-like particle is clearly visible. The rounded particle of the salt composition shows an absence of crystal faces or crystalline structure, instead the rounded particle appears to be made up of a large number of rounded microcrystals.

Example 9

Grinding Particles to Reveal the Interior

Figure 21:
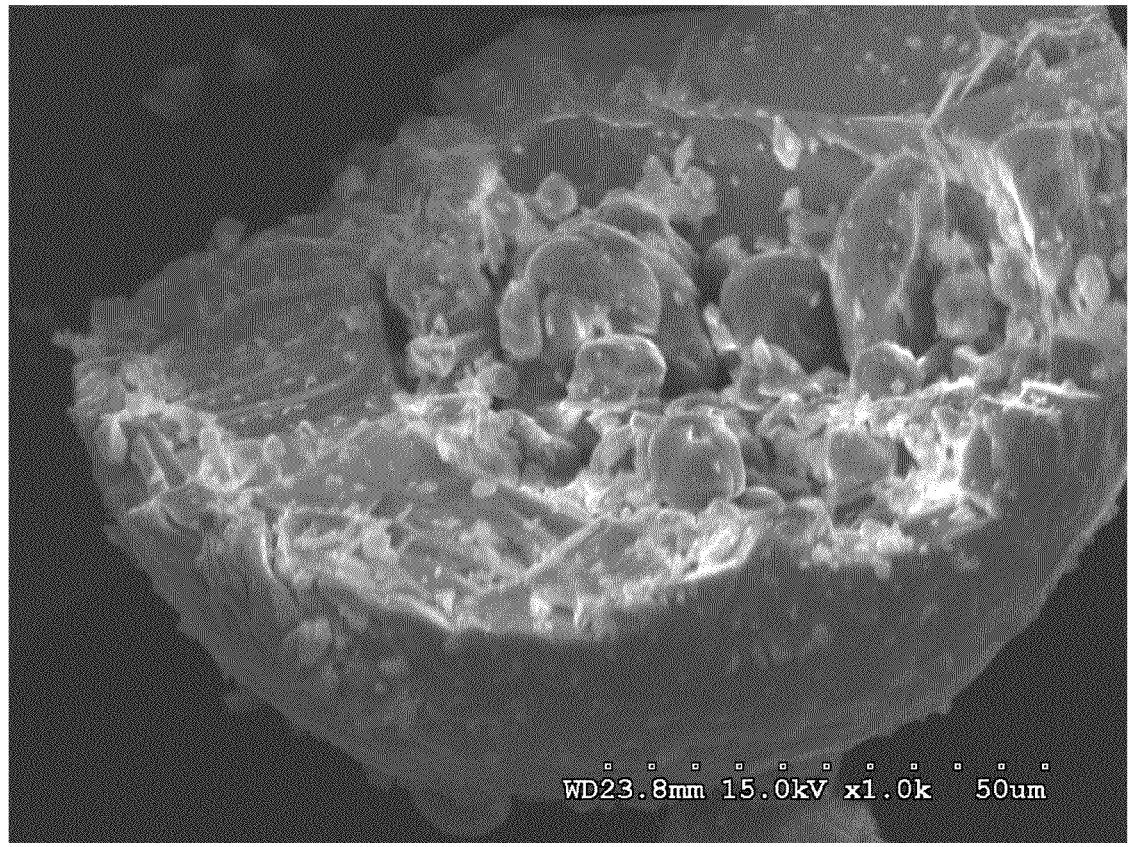
FIG. 21 shows a scanning electron microscope image of a 100% NaCl salt of the present invention where the particles have been ground to reveal the particle interior.
Figure 22:
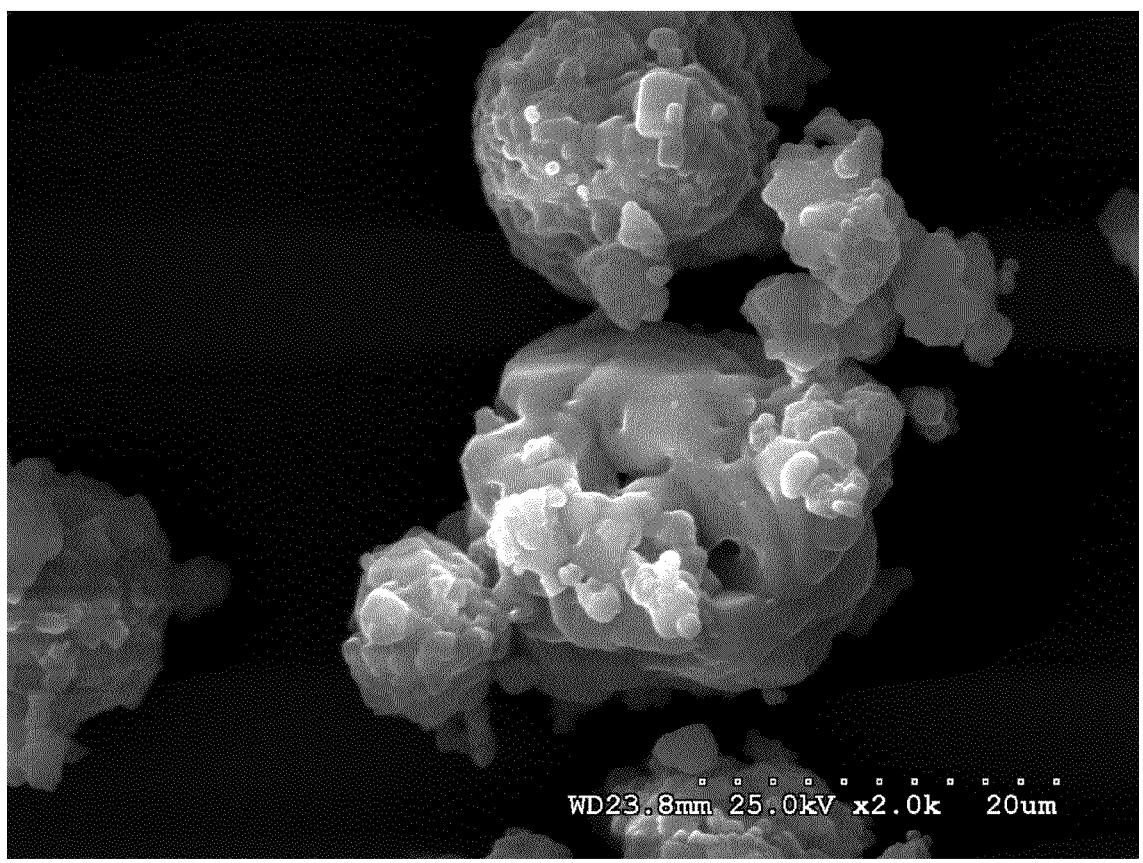
FIG. 22 shows a scanning electron microscope image of a blend of 50 wt % NaCl and 50 wt % KCl of the present invention where the particles have been ground to reveal the interior of the particles.

Particles produced in accordance with the present invention were ground to reveal the interior of the particles. FIG. 21 shows a SEM image of a 100% NaCl composition of the present invention. FIG. 22 shows a SEM image of a 50 wt % NaCl and 50 wt % KCl composition of the present invention. In both cases, the particles have been ground, and the interiors are revealed to have a unique semisolid structure, with void spaces. The void spaces can make up from about 5 volume percent to about 30 volume percent, and more typically from about 10 volume percent to about 20 volume percent of the total volume of the particle. The interiors are not totally solid, nor are they hollow. This unique structure is advantageous because it provides a large surface area. Smaller, high surface area particles can provide a faster, more salty delivery of sodium per unit sodium, allowing for the reduction in total sodium consumption while still providing desirable saltiness.

Example 10

Taste Panel

A taste panel compared meatballs flavored with two compositions of the present invention to meatballs flavored with (1) regular table salt and (2) sodium chloride/potassium chloride fines, which are ground 50 wt %/50 wt % blend of NaCl/KCl which are melted together and then ground (without aerosolization), with a size of minus 100 mesh. The two compositions of the present invention are (1) 50 wt % NaCl/ 50 wt % KCl (NBZ5050) in accordance with the present invention, and (2) 100% NaCl composition (NBZNaCl) in accordance with the present invention. The results are set forth in the Table 1 below for each of five panelists as well as the sum and the average. The panelists ranked the samples for saltiness, flavor and overall likability. The panelists ranked the samples on a scale of 1 to 10, with 1 being the lowest rank and 10 being the highest rank. As can be seen from Table 1, the two compositions of the present invention compared quite favorably with regular table salt and the Classic Fines.

TABLE 1

| Sample | Panelist 1 | Panelist 2 | Panelist 3 | Panelist 4 | Panelist 5 | Sum | Average |
|---|---|---|---|---|---|---|---|
| Meatball | | | | | | | |
| Saltiness | | | | | | | |
| NBZ5050 | 4 | 9 | 8 | 7 | 7 | 35 | 7 |
| NBZNaCl | 6 | 8 | 8 | 8 | 7 | 37 | 7.4 |
| Control | 7 | 6 | 7 | 8 | 6.5 | 34.5 | 6.9 |
| Classic Fines | 4 | 4 | 6 | 6 | 6 | 26 | 5.2 |
| Flavor | | | | | | | |
| NBZ5050 | 6 | 8 | 8 | 7 | 6 | 35 | 7 |
| NBZNaCl | 6 | 8 | 8 | 8 | 6.5 | 36.5 | 7.3 |
| Control | 7 | 7 | 7 | 8 | 5.5 | 34.5 | 6.9 |
| Classic Fines | 6 | 4 | 6 | 6 | 5.5 | 27.5 | 5.5 |
| Overall Liking | | | | | | | |
| NBZ5050 | 5 | 8 | 8 | 7 | 6.5 | 34.5 | 6.9 |
| NBZNaCl | 6 | 8 | 8 | 8 | 6.75 | 36.75 | 7.35 |
| Control | 7 | 7 | 7 | 8 | 6 | 35 | 7 |
| Classic Fines | 5 | 4 | 6 | 6 | 5.75 | 26.75 | 5.35 |

Scale (1-10):
1 = Lowest Rank - 10 = Highest Rank

The invention illustratively disclosed herein suitably may be practiced in the absence of any element, which is not specifically disclosed herein. It is apparent to those skilled in the art, however, that many changes, variations, modifications, other uses, and applications to the method are possible, and also changes, variations, modifications, other uses, and applications which do not depart from the spirit and scope of the invention are deemed to be covered by the invention, which is limited only by the claims which follow.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations, combinations, and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/ or equivalent structures, functions, ranges or steps are disclosed herein, and without intending to publicly dedicate any patentable subject matter.

What is claimed is:

1. A method for preparing a salt composition, the method comprising:

heating a salt composition to yield a melted salt composition;
aerosolizing the melted salt composition to form droplets; and
cooling the droplets to yield rounded particles defining internal voids,
wherein the salt composition, the melted salt composition, and the rounded particles comprise a salt selected from the group consisting of sodium salts, potassium salts, magnesium salts, and calcium salts.

2. The method of claim 1, wherein the salt composition comprises a sodium salt, a potassium salt, or a combination thereof.

3. The method of claim 1, wherein the salt composition comprises a chloride salt.

4. The method of claim 1, wherein the salt composition comprises sodium chloride.

5. The method of claim 4, wherein the salt composition further comprises a non-sodium chloride salt.

6. The method of claim 5, wherein the non-sodium chloride salt is selected from the group consisting of potassium chloride, magnesium chloride, calcium chloride, and combinations thereof.

7. The method of claim 5, wherein the non-sodium chloride salt comprises potassium chloride.

8. The method of claim 7, wherein the salt composition comprises between about 1 wt % and about 100 wt % sodium chloride and between about 0 wt % and about 99 wt % potassium chloride.

9. The method of claim 7, wherein the salt composition comprises between about 30 wt % and about 70 wt % sodium chloride and between about 30 wt % and about 70 wt % potassium chloride.

10. The method of claim 7, wherein the salt composition comprises between about 35 wt % and about 55 wt % sodium chloride and between about 45 wt % and about 65 wt % potassium chloride.

11. The method of claim 1, wherein the rounded particles are semisolid particles.

12. The method of claim 1, wherein the aerosolizing comprises treating the melted salt composition in at least one of a nebulizer, an ultrasonic atomizer, an electrospray atomizer, a centrifugal atomizer, and a gas atomizer.

13. The method of claim 1, further comprising sieving the rounded particles to isolate a particle size range.

14. The method of claim 1, wherein the rounded particles have a diameter from about 1 micron to about 1000 microns, or from about 3 microns to about 150 microns.

15. The method of claim 1, further comprising grinding the rounded particles.

16. The method of claim 1, wherein the temperature of the melted salt composition before aerosolizing is from about 650° C. to about 1000° C.

17. The method of claim 1, further comprising combining the rounded particles with at least one additive.

18. The method of claim 17, wherein the additive is selected from the group consisting of an antioxidant, a dietary supplement, a phosphate, an anti-caking agent, a colorant, a salt enhancer, an organic acid, an amino acid, an amino acid derivative, a sugar, a sugar derivative, and combinations thereof.

19. The method of claim 1, further comprising producing a salt substitute comprising the rounded particles.

20. The method of claim 1, wherein heating the salt composition comprises heating the salt composition in a furnace to yield the melted salt composition.

21. The method of claim 20, further comprising conveying the melted salt composition to at least one of a nebulizer, an ultrasonic atomizer, an electrospray atomizer, a centrifugal atomizer, and a gas atomizer.

22. The method of claim 1, wherein the salt composition contains less than about 1 wt %, 10 wt %, 20 wt %, 30 wt %, 40 wt %, 50 wt %, 60 wt %, 70 wt %, 80 wt %, 90 wt % or 100 wt % of sodium chloride.

23. A solid composition comprising rounded salt particles defining internal voids and consisting essentially of chloride salts.

24. A food product comprising:

a food material; and rounded salt particles produced from molten salt, wherein the rounded salt particles define internal voids and comprise sodium chloride, potassium chloride, or a combination thereof.

* * * * *